US009773026B1

(12) United States Patent
Tetreault et al.

(10) Patent No.: US 9,773,026 B1
(45) Date of Patent: Sep. 26, 2017

(54) CALCULATION OF SYSTEM UTILIZATION

(71) Applicants: Brian R. Tetreault, Framingham, MA (US); Daniel K. O'Reilly, Jr., Natick, MA (US); Benjamin Kelley, Worcester, MA (US); Tyler M. Graves, Framingham, MA (US)

(72) Inventors: Brian R. Tetreault, Framingham, MA (US); Daniel K. O'Reilly, Jr., Natick, MA (US); Benjamin Kelley, Worcester, MA (US); Tyler M. Graves, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 364 days.

(21) Appl. No.: 13/722,052

(22) Filed: Dec. 20, 2012

(51) Int. Cl.
*G06F 15/16* (2006.01)
*G06F 17/30* (2006.01)

(52) U.S. Cl.
CPC ................ *G06F 17/30286* (2013.01)

(58) Field of Classification Search
USPC .................................................. 709/224, 219
See application file for complete search history.

(56) References Cited

U.S. PATENT DOCUMENTS

| 7,784,098 | B1 * | 8/2010 | Fan et al. ..................... 726/25 |
| 8,234,380 | B1 | 7/2012 | Tetreault et al. |
| 2002/0107934 | A1 * | 8/2002 | Lowery ............... G06F 17/3087 709/213 |
| 2007/0011361 | A1 * | 1/2007 | Okada .................. G06F 3/0619 710/8 |
| 2008/0141048 | A1 * | 6/2008 | Palmer ............... H04L 67/1008 713/300 |
| 2008/0163239 | A1 * | 7/2008 | Sugumar et al. ............ 718/105 |
| 2011/0085512 | A1 * | 4/2011 | Lin et al. ...................... 370/329 |
| 2011/0227720 | A1 * | 9/2011 | Nakashiro et al. ........... 340/531 |
| 2012/0150527 | A1 * | 6/2012 | Creedon ............... G06F 3/0607 703/24 |
| 2012/0278022 | A1 * | 11/2012 | Kan et al. ....................... 702/85 |
| 2013/0073667 | A1 * | 3/2013 | Mukkara et al. ............ 709/213 |
| 2013/0185433 | A1 * | 7/2013 | Zhu ....................... H04L 67/303 709/226 |
| 2013/0205005 | A1 * | 8/2013 | Ashok et al. ................. 709/224 |
| 2014/0047104 | A1 * | 2/2014 | Rodriguez .................... 709/224 |

\* cited by examiner

*Primary Examiner* — Bryan Lee
*Assistant Examiner* — Oluwatosin Gidado
(74) *Attorney, Agent, or Firm* — Muirhead and Saturnelli, LLC

(57) ABSTRACT

Described are techniques for determining utilization. A plurality of indicator values for a plurality of utilization indicators for each system included in a set of one or more systems are received. Each of the plurality of indicator values represents a score for a different one of the plurality of utilization indicators. A system utilization score for each of the one or more systems is determined in accordance with the plurality of indicator values for each system. An overall utilization score of the set of systems is determined in accordance with the system utilization score for each of the one or more systems.

21 Claims, 14 Drawing Sheets

| Hallmark or indicator category 610 | Indicators 620 |
|---|---|
| Access 612 | last operating system login 612a<br>last usage or access using webserver 612b<br>last login using data storage management software 612c<br>last time of service mode execution for SP 612d |
| Resource Usage 614 | %storage provisioned 614a<br>average CPU utilization (%, or seconds) 614b<br>network traffic 614c<br>I/O throughput 614d |
| Configuration 616 | management software configuration status 616a<br>license installation status 616b<br>software version information 616c |
| Automated test 618 | last time system used for testing 618a |

| Hallmark or indicator category 810 | Indicators 820 |
| --- | --- |
| Secondary cache 812 | secondary cache full (%) indicator 812a<br>secondary cache hit rate (%) indicator 812b |
| Storage tiering 814 | % storage used per tier indicator 814a<br>I/O throughput per tier indicator 814b |
| Data protection 816 | % of provisioned storage elements which have snapshot schedules indicator 816a<br>% of provisioned storage elements which have active LOCAL data replication indicator 816b<br>% of provisioned storage elements which have active REMOTE data replication indicator 816c<br>% of disk space used for data protection indicator 816d<br>RPO indicator 816e<br>snapshot frequency indicator 816f |

FIGURE 6B

CALCULATION OF SYSTEM UTILIZATION

BACKGROUND

Technical Field

This application generally relates to techniques used in connection with system management and more particularly in connection with determining system usage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used. Management software may be used in connection with management of data storage systems or more generally any connected component such as in a networked arrangement. The management software may provide for monitoring and management of the data storage systems.

SUMMARY OF THE INVENTION

In accordance with one aspect of the invention is a method of determining utilization comprising: receiving a plurality of indicator values for a plurality of utilization indicators for each system included in a set of one or more systems, each of the plurality of indicator values representing a score for a different one of the plurality of utilization indicators; determining a system utilization score for each of the one or more systems in accordance with the plurality of indicator values for said each system; and determining an overall utilization score of the set of systems in accordance with the system utilization score for each of the one or more systems. The system utilization score for each system may be determined as a weighted average of the plurality of indicator values for each system. The set of systems may include a plurality of systems and the overall utilization score of the set of system may be determined as an average of the system utilization scores for the plurality of systems. Each system in the set may be a data storage system. The plurality of utilization indicators may include any of: last login to operating system indicator, last usage or access of a system using the webserver indicator, last interaction or login to data storage management software indicator, last time a storage processor of a system executed in a special service mode, percentage of storage provisioned indicator, average CPU load or CPU utilization, and network traffic indicator, a boolean indicator as to whether data storage management software has been configured or installed, a boolean indicator as to whether one or more licenses for software are installed on a system, a software version number, date or age of the currently installed software indicator, test data indicator identifying a most recent time that a system was used in connection with automated or other testing, secondary cache full indicator, secondary cache hit rate indicator, percentage of storage used indicator per tier, I/O throughput indicator for each tier, percentage of provisioned storage elements which have snapshot schedules indicator, percentage of provisioned storage elements which have active local data replication indicator, percentage of provisioned storage elements which have active remote data replication indicator, percentage or amount of disk space used for data protection indicator, and snapshot frequency indicator, and wherein the plurality of utilization indicators are partitioned into a plurality of utilization indicator categories include any of: access indicator category, resource usage indicator category, configuration indicator category, automated test indicator category, secondary cache category, storage tiering category, and data protection category. The plurality of utilization indicators may include a first utilization indicator from a first of the plurality of utilization indicator categories and a second utilization indicator from a second of the plurality of utilization indicator categories. The plurality of utilization indicators may include multiple utilization indicators from a same one of the plurality of utilization indicator categories. The set of systems may include a plurality of systems. The plurality of utilization indicators may include a first utilization indicator, and the plurality of indicator values for each of the systems may include a first indicator value for the first utilization indicator. The method may include collecting a plurality measurement values for the first utilization indicator, each of the plurality of measurement values identifying a measurement of the first utilization indicator for one of the plurality of systems; determining a mean and a standard deviation with respect to the plurality of measurement values; and determining the first indicator value for the first utilization indicator for each of the systems in accordance with the standard deviation and a difference between one of the measurement values for said each system and the mean. The set of systems may include a plurality of systems, the plurality of utilization indicators may include a first utilization indicator, and the plurality of indicator values for each of the systems may include a first indicator value for the first utilization indicator. The method may include collecting a plurality measurement values for the first utilization indicator, each of the plurality of measurement values identifying a measurement of the first utilization indicator for one of the plurality of systems; and determining the first indicator value for the first utilization indicator for each of the systems in accordance with a set of predetermined ranges and indicator values associated with each of the predetermined ranges. The set of systems may include a plurality of systems, the plurality of utilization indicators may include a first utilization indicator, and the plurality of indicator values for each of the systems may include a first indicator value for the first utilization indicator. The method may include collecting a plurality measurement values for the first utilization indicator, each of the plurality of measurement values identifying a measurement of the first utilization indicator for one of the plurality of systems; determining a mean and a standard deviation with respect to the plurality of measurement values; determining a threshold measurement value associated with a specified percentage denoting that the specified percentage of the plurality of systems has a measurement value included in said plurality of measurement values that is equal to the threshold measurement value; for each of the plurality of measurement values for one of the plurality of systems, determining whether said each measurement value is greater than said threshold measurement value; and if said each measurement value is greater than said threshold measurement value, determining the first indicator value for the first utilization indicator for said one system in accordance with the standard deviation and a difference between said measurement value and the mean, and otherwise determining the first indicator value for the first utilization indicator for said one system in accordance with a set of predetermined ranges and indicator values associated with each of the predetermined ranges. The plurality of utilization indicators for each system may be selected from a set of available utilization indicators and associated weights included in a usage profile. The usage profile may be one of a plurality of usage profiles, and each of the plurality of usage profiles may identify one or more of utilization indicators from the set of available indicators. Each usage profile may customize selection of utilization indicators and associated weights for any of a particular purpose, and determining utilization with respect to one or more particular resources of one of the systems Each of the plurality of utilization indicator values for one of the plurality of utilization indicators may be determined by normalizing a measurement value for said one utilization indicator. Normalizing may include mapping the measurement value to an indicator value in a predetermined range.

In accordance with another aspect of the invention is a system comprising: a plurality of data storage systems; a computer readable medium comprising code stored thereon for: receiving a plurality of indicator values for a plurality of utilization indicators for each of the plurality of data storage systems, each of the plurality of indicator values representing a score for a different one of the plurality of utilization indicators; determining a data storage system utilization score for each of the one or more data storage systems in accordance with the plurality of indicator values for said each data storage system; and determining an overall utilization score of the plurality of data storage systems in accordance with the system utilization score for each of the plurality of data storage systems. The data storage system utilization score for each data storage system may be determined as a weighted average of the plurality of indicator values for each data storage system. The overall utilization score may be determined as an average of the data storage system utilization scores for the plurality of data storage system. Processing to determine a first of the indicator values for one of the plurality of utilization indicators may include performing statistical analysis of a measurement for the one utilization indicator.

In accordance with another aspect of the invention is a computer readable medium comprising code stored thereon for determining utilization, the computer readable medium comprising code for: receiving a set of one or more indicator values for a set of one or more corresponding utilization indicators for each of a plurality of systems, each indicator value in the set of indicator values representing a score for a different one of the utilization indicators in the set of one or more corresponding utilization indicators; determining a system utilization score for each of the plurality of systems in accordance with the set of indicator values for said each system; and viewing the system utilization score for each of the plurality of systems on a user interface display. The computer readable medium may further include code for determining an overall utilization score for the plurality of systems in accordance with the system utilization score for each system.

BRIEF DESCRIPTION OF THE DRAWINGS

Features and advantages of the present invention will become more apparent from the following detailed description of exemplary embodiments thereof taken in conjunction with the accompanying drawings in which:

FIGS. 2A and 6B are examples of indicators and associated hallmarks or categories that may be used in an embodiment in accordance with techniques herein;

DETAILED DESCRIPTION OF EMBODIMENT(S)

Figure 1:
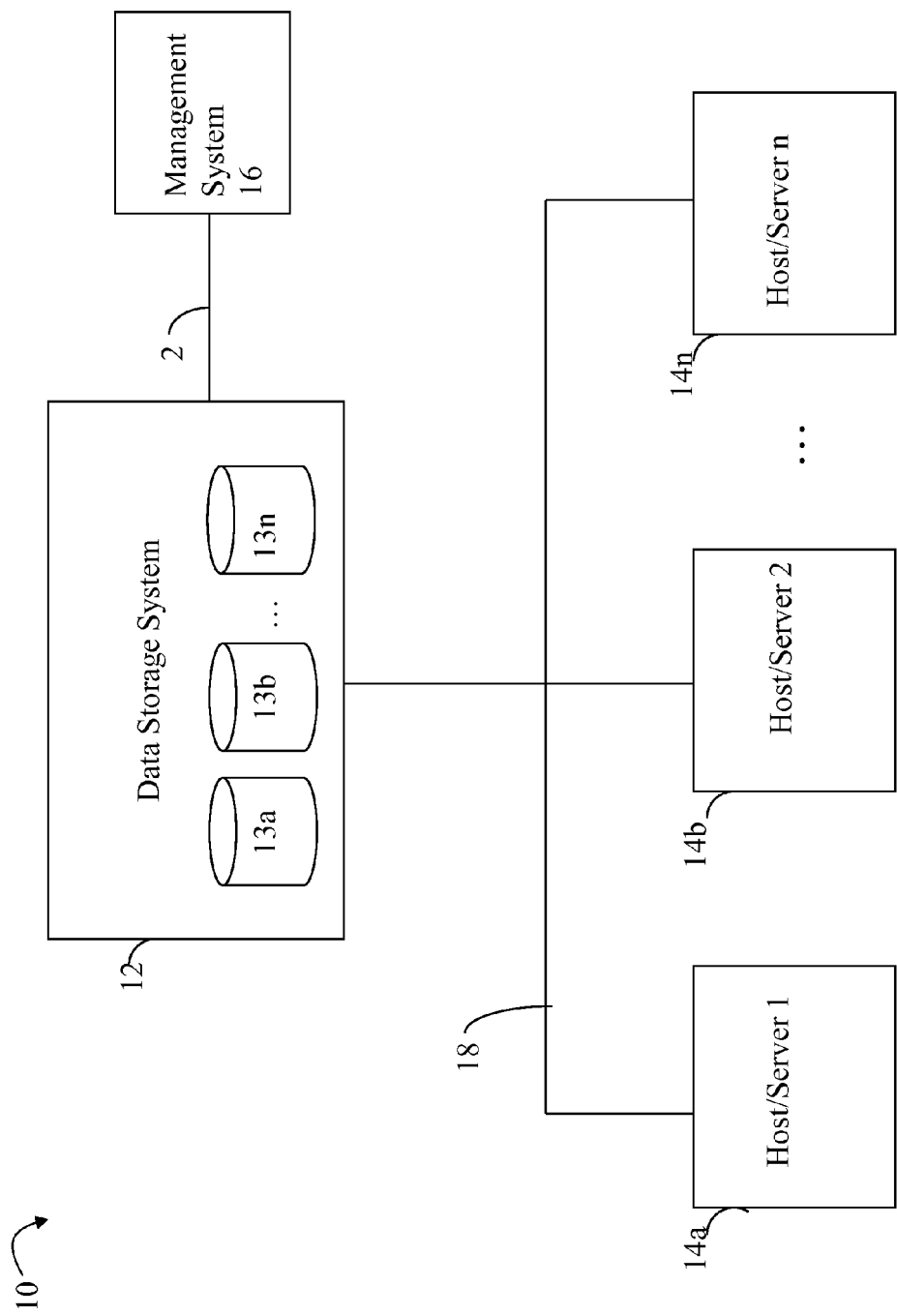
FIG. 1 is an exemplary embodiment of a data storage environment that may utilize the techniques described herein.

Referring to FIG. 1, shown is an example of an embodiment of a system that may be used in connection with performing the techniques described herein. The system 10 includes one or more data storage systems 12 connected to server or host systems 14*a*-14*n* through communication medium 18. The system 10 also includes a management system 16 connected to one or more data storage systems 12 through communication medium 2. In this embodiment of the system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

It should be noted that disks may generally refer to physical data storage devices (PDs) which may include rotating disk drives as well as other types of data storage such as using different technologies. PDs may also include, for example, flash-based storage devices, or more generally SSDs (solid state storage devices) as well as other technologies known in the art.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
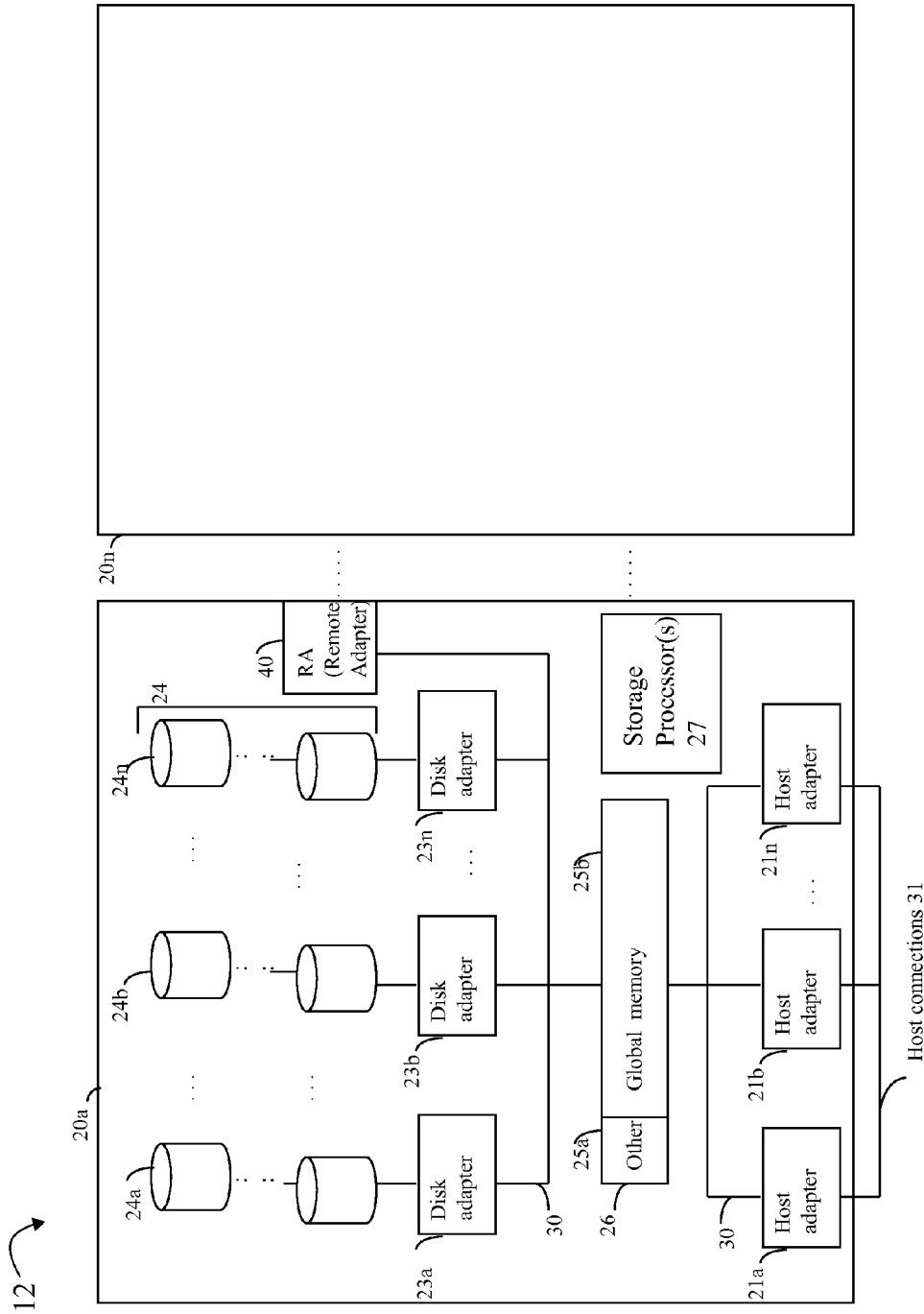
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors.

Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more main CPUs or storage processors (SPs) 27. An embodiment may include any number of such SPs. For example, the VNX® data storage system by EMC Corporation includes two SPs. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs, RAs (remote adapters) and the like, as described herein. Components of the data storage system, such as an HA, which may communicate with a host may also be referred to as front end components. Within the data storage system, components which may be characterized as backend components communicate with a front end component. An example of a backend component is a DA. In connection with data storage systems such as by EMC Corporation, various types of directors or adapters may be implemented as a processor, or, more generally, a component that includes the processor. Examples of directors are DAs, HAs, RAs, and the like.

One or more internal logical communication paths may exist between the DAs, the RAs (remote adapters), the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

In one embodiment, data used to service read and write requests may use data stored in cache. A write operation received from a host by the data storage system may be stored in cache, marked as "write pending" (not yet destaged) and then written out to the physical storage device, or destaged from cache, at a later point in time. An acknowledgement may be sent to the host that the write has successfully completed once the data has been written to cache. Once the write pending data has been destaged from cache to the physical storage device, the cache location including the write pending data may be used to service other data operations. As may be needed, the cache location may also be made available to store other new write data for a new write operation to a different data location. For a read operation, a determination may be made as to whether the data is in cache. If so, the data may be retrieved from cache and used to service the read operation by returning the data to the requesting host. If the requested read data is not in cache, the data may be first read from the physical storage device and copied into cache, such as by an appropriate DA servicing that particular physical device. The cached copy of the requested read data may then be retrieved from cache, such as by an FA, and used to service the read operation by returning the data to the requesting host.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

An embodiment in accordance with techniques herein may have one or more defined storage tiers in the data storage systems. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID configuration (e.g., RAID-0, RAID-1, RAID-5, RAID-6), storage capacity, and the like. The storage type or technology may specify whether a physical storage device is an SSD drive (such as a flash drive), a particular type of SSD drive (such as using flash or a form of RAM), a type of rotating magnetic disk or other non-SSD drive (such as an FC disk drive, a 10K RPM FC disk drive, a 15K RPM FC disk drive, a SATA (Serial Advanced Technology Attachment) drive), SAS (Serial Attached SCSI), and the like. Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC disk drives, and a third tier of all SATA disk drives. In terms of general expected performance, the SSD or flash tier may be considered the highest performing tier. The FC drives may be considered the second or next highest performing tier and the SATA drives may be considered the lowest or third ranked tier in terms of expected performance. The foregoing are some examples of tier definitions and other tier definitions may be specified in accordance with techniques herein.

Management software may execute on the data storage system and/or management system. The management software may allow administrators to manage a large number of data storage systems collectively from a single system such as the management system 16 using centralized monitoring software. A client, such as a user interface (UI) of the data storage system management software included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives (e.g., physical devices), and the like. The management software may be used in collecting data for various metrics as described herein in connection with the one or more data storage systems and/or other components being managed.

Described in following paragraphs are techniques that may be used in connection with the management software to provide an administrator with functionality for determining different aspects of utilization for single data storage system as well as in the aggregate across multiple data storage systems. Determining a level of utilization or usage of one or more data storage systems may be desirable for a variety of different purposes and with respect to different resources of the data storage systems. Techniques herein provide for customization and selection of appropriate metrics or indicators that may vary with the particular purpose for which utilization is determined. For example, data storage systems may be used for testing purposes for code developers and also by end-users or customers for data storage provisioning. The particular indicators selected when making a determination as to whether a data storage system is being used and/or determining a level of utilization may vary with each of the particular purposes of testing or data storage provisioning. Techniques herein may be used with management of multiple data storage systems to analyze, score and rank storage systems to automatically perform quantitative assessments of how 'used' a system is. Individual indicators may be defined which reflect a single aspect of system utilization, which may then be grouped into hallmarks or indicator categories. A software engine may perform processing to score each indicator, perform statistical analysis of that indicator across the population of multiple data storage systems to weigh an indicator value or instance properly, and generate an overall 'score' of utilization for any one single data storage system. The data storage system level utilization scores may then be further combined to determine an aggregated utilization score for across all data storage systems. The different data storage system level scores may also be reported and compared, and used in connection with historical trending, to provide useful information to system administrators.

As described in following paragraphs, usage of a data storage system, or more generally, any system or component, may involve assessing multiple indicators or metrics and then viewing such information in the aggregate. For example, usage assessment may include viewing more indicators than just CPU utilization levels or when someone was last logged into a system. A CPU may execute when performing any variety of processing tasks and may be only one of the system resources utilized so it may be relevant to look at one or more additional indicators when assessing utilization for a particular purpose. Techniques herein consider generally criteria of one or more factors used in making a utilization assessment. Definition of usage and considerations for determining a metric which quantifies such usage may vary with the particular customer, storage environment, factors and resources which are important for making a utilization assessment for a particular purpose, and the like. For example, it may be desirable to determine whether a data storage system is being "used" since testing of code that executes on the data storage system may require standalone or exclusive use during testing. If indicators of the data storage system are examined regarding whether storage was provisioned recently, such indicators may lead to a false conclusion regarding the particular testing usage of the data storage system desired. As such, techniques herein described in following paragraphs provide for customized selection and weighting of indicators depending on the particular purpose for which utilization is being assessed. As another step in determining utilization, if multiple indicator values are received for a single data storage system and/or across multiple data storage systems, techniques herein describe processing for combining such multiple indicator values. As described in more detail below, indicators may be partitioned into categories or hallmarks. One or more relevant indicators for a purpose for which utilization is being determined may be selected and combined using associated weights to determine utilization scores for each data storage system and also for all data storage systems in the aggregate. It should be noted that the particular purposes such as data storage system testing (e.g., for a data storage system code developer and tester) and utilization of provisioned storage (e.g., for a data storage system customer) are only two exemplary usage aspects for which techniques herein may be performed.

Referring to FIG. 2A, shown is an example of utilization indicators and associated hallmark or indicator categories that may be used in an embodiment in accordance with techniques herein. The example 600 illustrates some indicators that may be used in connection with techniques herein for the particular purpose of determining data storage system utilization in a laboratory or testing contents such as a data storage system code development and testing environment. However, additional indicators may be utilized for assessing utilization for this purpose. Additionally, the indicators listed here may also be used for other purposes for assessing utilization. It should also be noted that although the indicators of 600 are suitable for data storage system testing, the same set of indicators may not be suitable for determining utilization for other purposes and contexts, such as an end user data storage system customer context as described elsewhere herein.

The example 600 includes a table with a first column of hallmark or indicator categories 610 and a second column of indicators 620. The indicators in column 620 have been partitioned into 4 illustrated indicator categories as denoted in column 610. Generally, each of the categories of 610 represent a grouping of indicators that may be used in determining a level of utilization of a single data storage system and/or across multiple data storage systems. It should be generally noted that metrics used in connection with different indicators such as in the example 600 and elsewhere herein may be average values over a time period.

The access indicator category 612 may include the following indicators: last login to operating system of the data storage system 612a, last usage or access of the data storage system using the webserver 612b, last interaction or login to the data storage management software 612c, and last time any SP of the data storage system executed in a special service mode/rescue mode 612d. It should be noted that the special service mode of execution may be used in connection with an SP determined as unhealthy such as described, for example, in U.S. Pat. No. 8,234,800, issued Jul. 31, 2012, which is incorporated by reference herein.

The resource usage indicator category 614 may include the following indicators: % of storage provisioned (e.g., % of PDs provisioned or configured for use vs. PDs which have not yet been provisioned or configured for use) 614a, average CPU load or CPU utilization 614b (may be in terms of seconds or % of CPU utilization as opposed to being idle), and network traffic 614c (e.g., number of packets, percentage of maximum bandwidth, data transfer rate such as bytes/second, etc.), and the like. The CPU utilization may be with respect to the SPs or main processors of the storage system and may not include utilization with respect to other components such as DAs, FAs and other directors which may include processors. Other resource usage indicators may relate to other performance aspects of the data storage system such as I/O throughput 614d. Although not listed in the example 600, yet other resource usage indicators may be related to indicators regarding usage for particular components or types of components such as DAs, FAs, cache, and the like.

The configuration indicator category 616 may include the following indicators: a Boolean indicator 616a as to whether the data storage management software has been configured or installed (e.g., if such management software is not configured or installed, this is one indicator regarding a particular type of access and usage of the data storage system that has not been enabled), a Boolean indicator 616b as to whether one or more licenses for software are installed on the data storage system (e.g., if software licenses are not installed, this may be an indicator that the system is not being used), and software version number, date or age of the currently installed software 616c (e.g., if the installed software is not up to the latest version, this is an indicator that the system may not have been recently used. The older the currently installed version of the software, the more this indicator denotes that the system has not been recently used or may be used to decrease the utilization scoring. Note that this age with respect to the currently installed software may denote that age with respect to a date of a current revision, update, patch, or customization of a particular software version).

The automated test indicator category 618 may include the test indicator date 618a identifying the last or most recent time that the data storage system was used in connection with automated or other testing.

Figure 2B:
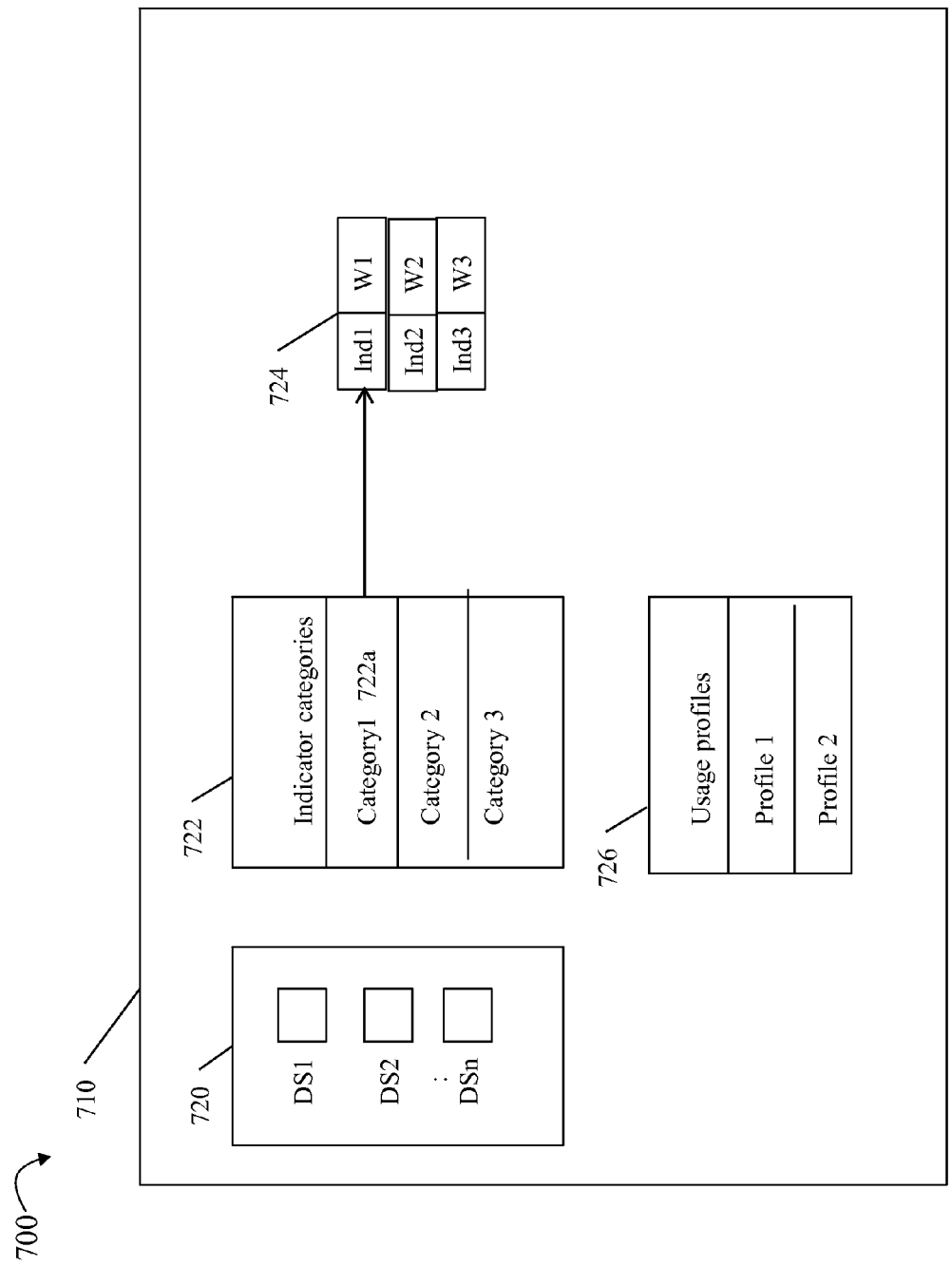
FIG. 2B is an example of information that may be included in a user interface display in an embodiment in accordance with techniques herein.

Referring to FIG. 2B, shown is an example of a screenshot such as may be displayed in a connection with a GUI in an embodiment in connection with techniques herein. The example 700 includes a screenshot 710 with items that may be displayed to a user in connection with selecting items for use in determining utilization. The example 710 includes a list 720 of data storage systems that may be included in a data center for which data storage system management and monitoring are performed. A user may select one or more data storage systems from the list 720 for which utilization may be determined in connection with techniques herein. Element 722 may be a list of the different indicator categories or hallmarks such as described in connection with FIG. 2A and elsewhere herein. Once a particular category such as 722a is selected from the list 722, another list of indicators 724 in that selected category 722a may be displayed. The list 724 may identify one or more indicators (denoted ind1, ind2, etc.) and associated weights (denoted W1, W2, W3). From the list 724, the user may select the particular indicators used in determining utilization of the selected systems from 720. Additionally, as described herein, each indicator may have an associated weight denoting a level of importance in connection with determining utilization. A user may be allowed to modify or customize the weight of each indicator used in the utilization calculation. Also described in more detail below, usage profiles 726 may provide a recommended or default set of indicators and associated weights for a particular purpose. On the UI display, a list 726 of available usage profiles may be provided from which the user may make a selection for a particular profile. For example, with respect to the testing purpose as illustrated in FIG. 2A, a usage profile may be included in the list 726 which identifies the particular indicators of FIG. 2A for the particular purpose of determining utilization of a data storage system with respect to the data storage system testing or development context. Selection of a particular profile from 726 may result in assignment of default weights to selected indicators customized for this particular usage context. Such default values may be displayed in 722 and 724 for the selected profile.

As illustrated in FIG. 2B, an embodiment may provide a data storage administrator or other user performing the usage assessment with the option of selecting which one or more indicators to include/not include along with optional associated indicator weights in connection with the utilization determination. In this manner, an embodiment may provide for customizing the particular one or more indicators and associated weights used in determining utilization in accordance with the particular application or purpose for which the utilization is performed. It should be noted that the display of the GUI may include additional menus, options, and UI elements providing other additional functionality than as just described. The elements of FIG. 2B may be included in a UI display along with other such UI elements that may vary with embodiment and as also described elsewhere herein.

There are various approaches that may be used in an embodiment in accordance with techniques herein regarding how a utilization score may be generated when considering one or more utilization indicators in the aggregate for each data storage system and then further determining a combined utilization across multiple systems. Generally, the aggregated data set of indicator values may be analyzed per metric or indicator and also on a per data storage system basis. A grade or score may be assigned for each metric per data storage system and then determine an overall data storage system level score based on different per-indicator scores for each single data storage system. An embodiment may determine a data system level overall score for each data storage system, such as each data storage array, and then determine a combined score for the entire data center including the multiple data storage systems based on all the data storage system level scores. Additionally, as described below in more detail in connection with combining multiple metrics, an embodiment may perform processing to normalize multiple metrics as each one may have a different range and types of possible values and different levels of granularity for determining different indicator values.

Figure 2C:
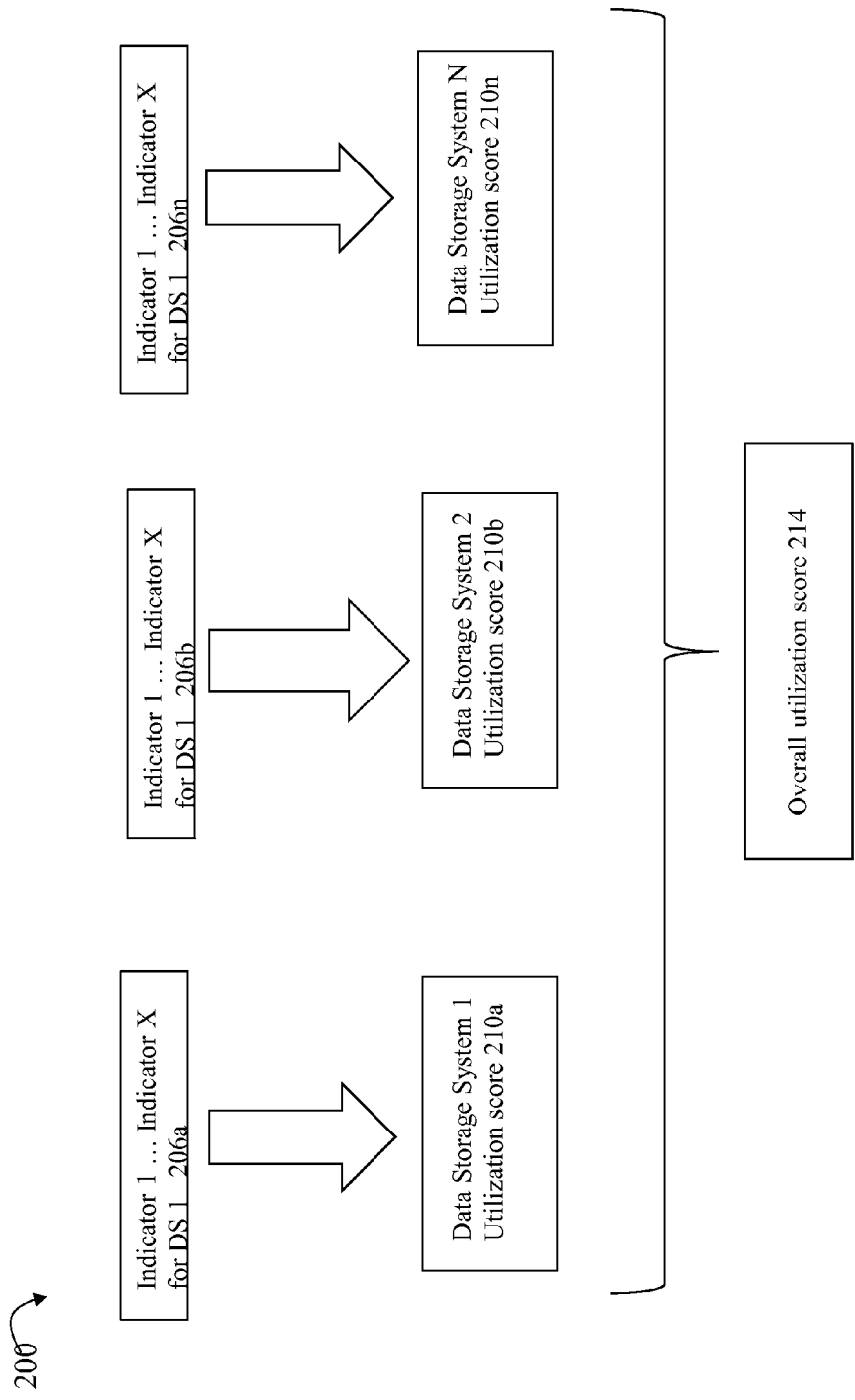
FIG. 2C illustrates calculation of data storage system level utilization scores and an overall utilization score as may be performed in an embodiment in accordance with techniques herein.

Referring to FIG. 2C, shown is an example generally illustrating how a utilization score may be determined in an embodiment in accordance with techniques herein for N data storage systems, N being an integer value greater than 2. It should be noted that although the example 200 illustrates combining multiple indicators for multiple data storage system, the techniques herein may be used to combine as few as a single indicator for each of multiple data storage systems and may be used to combine multiple indicators for a single data storage system.

An overall utilization score 214 may be determined by first determining a system level score for each data storage system based on multiple indicators of each data storage system. For example, element 206a illustrates indicators 1 through X, X being an integer greater than 1, for which indicator values regarding utilization are determined for data storage system 1. The values for the indicators 206a may be combined to determine an aggregated or total data storage system level score for data storage system 1 as represented by 210a. Similarly, each set of indicator values 206b-206n for a corresponding data storage system 1-N may be combined to determine, respectively, a data storage system level utilization score 210b-210n. Subsequently, the data storage system level utilization scores 210a-n may be further combined to determine an overall utilization score 214 representing an aggregated score across all data storage systems 1-N (e.g., for the entire data center).

In an embodiment, weights may be associated with the different indicators so that the utilization score for a single data storage system identified as DS X may be represented as:

$$DS\ X\ \text{utilization score} = \sum_{i=1}^{N} \text{ind}_i * w_i \quad \text{EQUATION A1}$$

where

DS X represents that this is the utilization score for data storage system X;

$\text{ind}_i$ represents the $i^{th}$ indicator, $1 \leq i \leq N$, i and N being integers, N representing the total number of indicators selected; and $w_i$ represents the $i^{th}$ weight associated with the $i^{th}$ indicator.

The overall utilization score across all M data storage systems may be determined as:

$$\text{Overall utilization score} = \frac{\sum_{i=1}^{M} DS\ \text{utilization score}_i}{M} \quad \text{EQUATION A2}$$

where DS utilization score$_i$ represents the utilization score of the $i^{th}$ data storage system. EQUATION A2 represents the overall utilization score determined as the average of all individual data storage system utilization scores. However, an embodiment may also weight each of the different data storage system utilization scores differently so that the overall utilization score may be more generally represented as:

$$\text{Overall utilization score} = \sum_{i=1}^{M} DS\ \text{utilization score}_i * w_i \quad \text{EQUATION A3}$$

where DS utilization score$_i$ represents the utilization score of the $i^{th}$ data storage system and $w_i$ is the weight associated with DS utilization score i.

What will now be described is further detail regarding how an embodiment may determine an indicator value or score for a single indicator in accordance with techniques herein.

Figure 3:
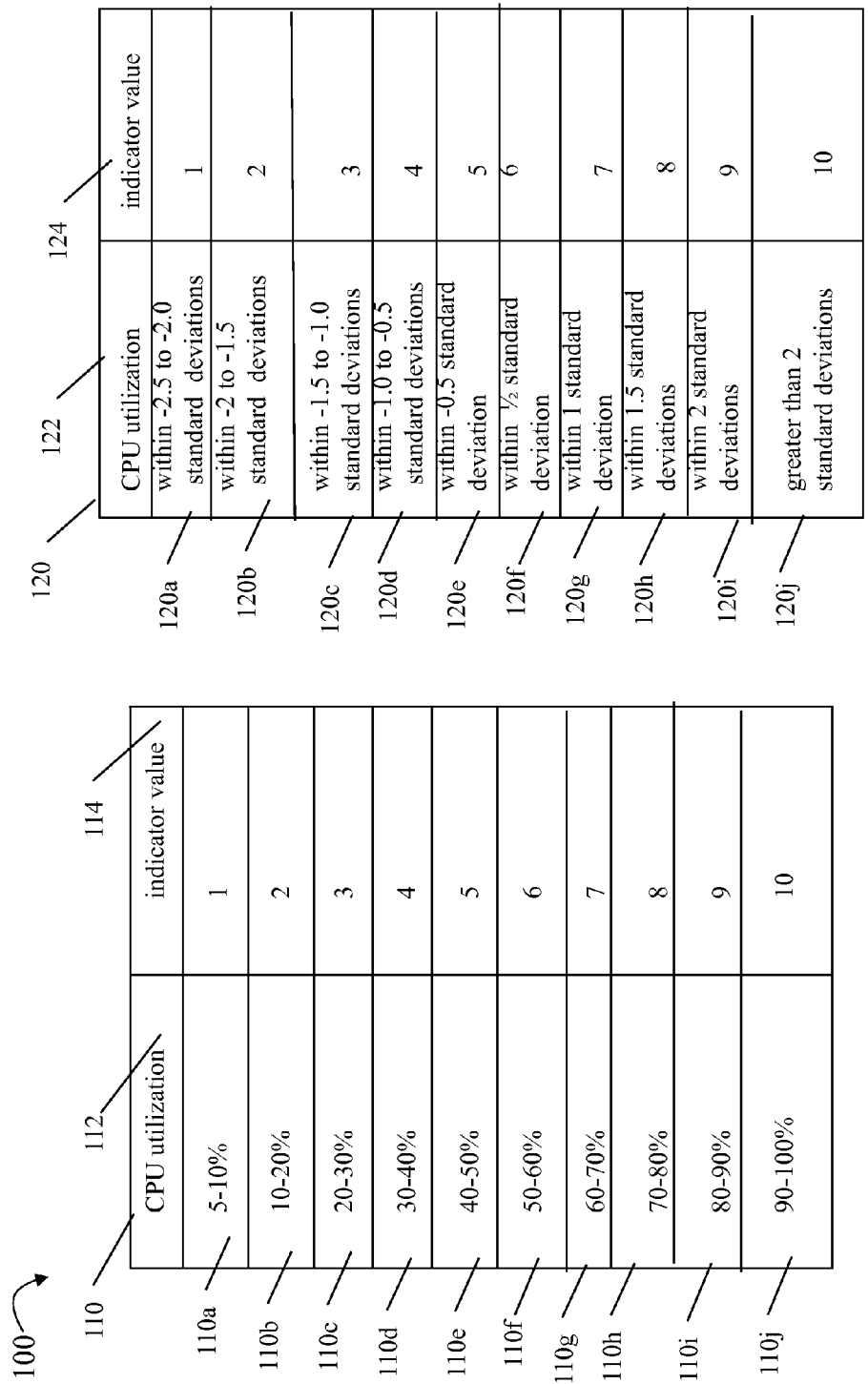
FIGS. 3, 3B, 4A and 4B are examples of different mappings between metric values and indicator values that may be used in an embodiment in accordance with techniques herein.

With reference to FIG. 3, using a first technique, an embodiment may determine a score for each data storage system based on different CPU utilization percentage ranges. For example, table 110 includes a first column 112 of different CPU utilization amounts and a second column 114 of corresponding graduated values for each different CPU utilization range included in the same row of the table 110. With each row of the table 110, the table 110 may define a mapping of raw values, such as a measurement for a single metric or indicator, in column 112 to an indicator value denoting a score for that particular indicator in column 114. Each of 110a-110j may denote a range of CPU utilization percentages for the data storage system which is mapped to a scaled or normalized value, inclusively, in the integer range of 1 through 10. For example, element 110a denotes a CPU range of greater than 5% up to and including 10%, element 110b denotes a CPU utilization range of greater than 10% up to and including 20%, and so on. Although not indicated in the table 110, if the CPU utilization is 5% or less, then the indicator value may be zero denoting an idle state. Thus, table 110 may use predetermined CPU utilization ranges of values in determining the indicator value for CPU utilization.

Using a second technique, an embodiment may determine a score for each data storage system based on the variance of each data storage system's CPU utilization from the mean of such values. In this manner, rather than use predefined absolute integers for the ranges and associated grading boundaries as in the table 110, an embodiment may define the boundaries of the different indicator value assignments in terms of standard deviations with respect to the mean. For example, an embodiment may include 3 data storage systems and may determine the average or mean % CPU utilization for each data storage system. The standard deviation used in determining the boundaries for indicator values may be based on the mean. For example, table 120 includes a first column 122 of different CPU utilization amounts and a second column 124 of corresponding graduated indicator values for each different CPU utilization range included in the same row of the table 120. With each row of the table 120, the table 120 may define a mapping of raw indicator values in column 122 to an indicator score in column 124. Each of 110a-110j may denote a range of CPU utilization for the data storage system expressed in terms of standard deviations from the mean which is mapped to a scaled or normalized value, inclusively, in the integer range of 1 through 10. For example, element 120a denotes a CPU range of greater than −2.5 standard deviations up to and including −2.0 standard deviations, element 120b denotes a CPU utilization range of greater than −2.0 standard deviations up to and including −1.5 standard deviations, and so on. Although not indicated in the table 120, if the CPU utilization is outside of the range of −2.5 standard deviations, then the indicator value may be zero. Thus, table 112 may use standard deviation with respect to the mean CPU utilization of all data storage systems being considered when determining the indicator value for CPU utilization for each of the data storage systems.

Using yet a third technique, an embodiment may base the indicator value on a weighted combination of indicator values determined using the above-mentioned first and second techniques for a data storage system. For example, a first indicator value of 5 may be determined for a first data storage based on CPU utilization using table 110, A second indicator value of 3 may also be determined for the first data storage system based on CPU utilization using the second technique with table 120. A final data storage system CPU utilization indicator value may be determined based on a combination of the above-mentioned first and second indicator values such as using weights assigned to each of the first and second indicator values. The weights being equal (e.g, 50% weight for each of the foregoing first and second indicators) results in the final CPU utilization indicator for the data storage system being an average=4 (e.g., (3+5)/2=4). However, an embodiment may use different weights assigned to each of the first and second indicators. For example, an embodiment may assign 0.4 to the first indicator value and 0.6 to the second indicator value so that the final CPU utilization indicator for the data storage system may be calculated as (0.4*3)+(0.6*5)=4.2.

It should be noted that in connection with tables 110 and 120, an embodiment may allow a data storage administrator to configure or define the boundaries and/or or the expected mean or average value. For example, in connection with table 110, an embodiment may allow a user to specify the different CPU utilization ranges and/or associated indicator values. An embodiment may allow a user to specify the mean or average value to use in connection with table 120 rather than use the calculated mean of the actual observed CPU utilization metrics. In this manner with the table 120, the user-specified CPU utilization % expected may be characterized as an expected average value.

Figure 3B:
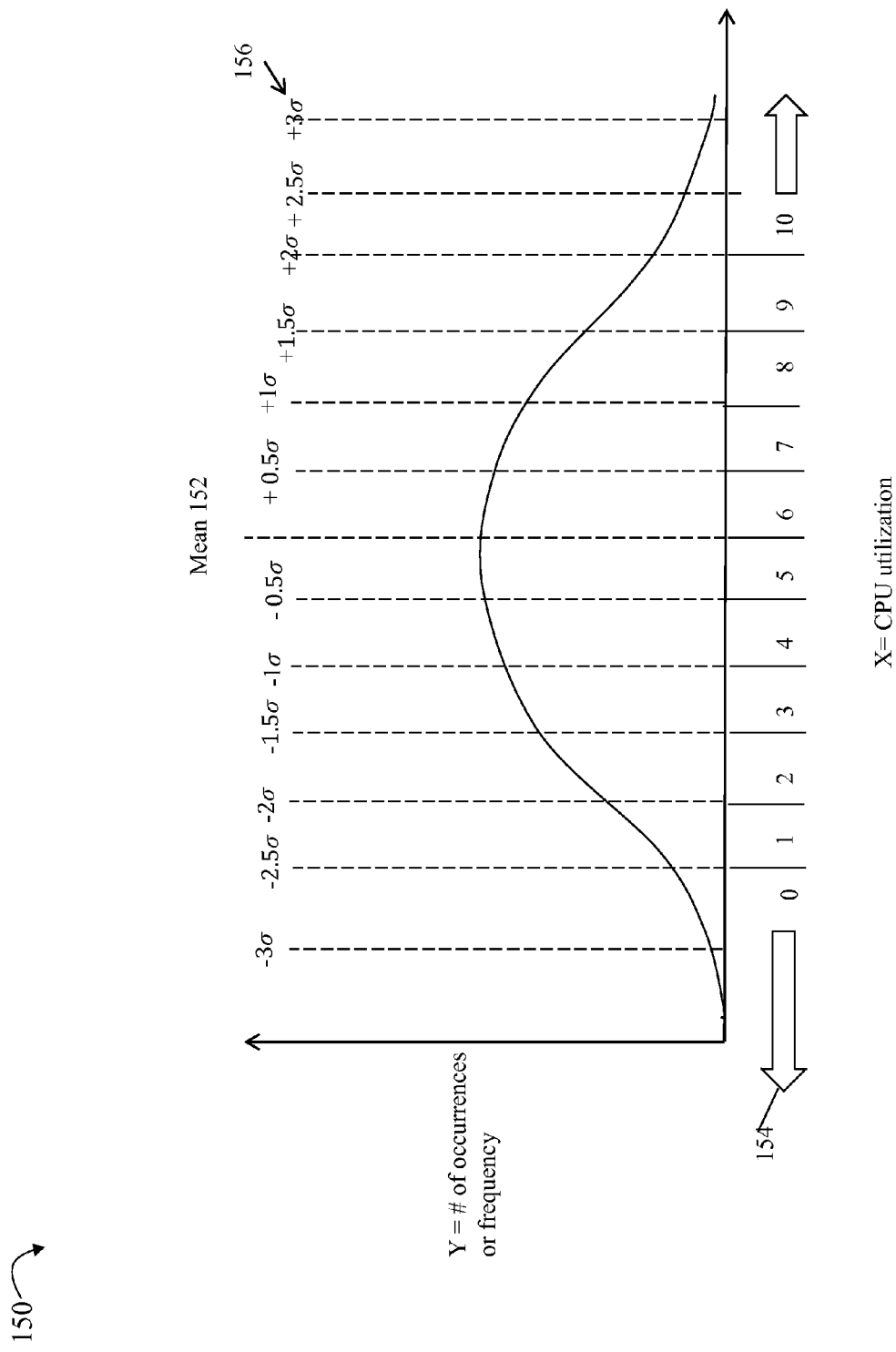

The use of standard deviations in determining an indicator value as a score for an indicator is described in more detail in following paragraphs such as in connection with FIG. 3B.

In connection with statistical analysis as described herein, such as in connection with table 120 above, standard deviation, σ, with respect to a population or sample set, may be determined as represented in EQUATION A4 below:

$$\sigma(x) = \sqrt{\frac{\sum_{i=1}^{N}(x-\bar{x})^2}{N-1}} \quad \text{EQUATION A4}$$

where "N" represents the total number of measurements in the population or sample set size for which the standard deviation is being determined, "i" is an integer index ranging from 1 to N, $\bar{x}$ represents the arithmetic mean or average of all N values in the sample set, "x" represents the $i^{th}$ measurement instance of the sample set, and Σ is the summation function summing the difference between each value of x and the mean $\bar{x}$. The variance is the square of the standard deviation, In statistics, standard deviation and variance may be characterized as metrics denoting an amount of variation or dispersion that exists from the average (e.g., mean or expected value) of measurement value of a sample set or population. A lower variance indicates that the N measurement values of the sample set tend to be very close to the mean (e.g., not much dispersion or variation from the mean). In contrast, the higher the standard deviation, the more spread out or dispersion there is of the sample set values with respect to the mean. In connection with a particular distribution, commonly referred to as the normal bell-shaped distribution known in the art, about 68% of values drawn from a normal distribution are within one standard deviation σ away from the mean (e.g., −1σ to +1σ); about 95% of the values lie within two standard deviations (e.g., −2σ to +2σ); and about 99.7% are within three standard deviations (e.g., −3σ to +3σ).

The probability density function (PDF) for a continuous random variable X having a value between any two numbers a and b may be expressed as:

$$P(a \le X \le b) = \int_a^b f(x)dx \quad \text{EQUATION A5}$$

where the probability that X takes on a value in the interval [a; b] is the area above this interval and under the graph of the density function. The graph off (x) is often referred to as the density curve. The PDF is a function that describes the relative likelihood for this random variable to take on a given value. The probability for the random variable to fall within a particular region is given by the integral of this variable's density over the region. The probability density function is nonnegative everywhere, and its integral over the entire space is equal to one.

A percentile is the value of a variable below which a certain percentage of observations fall. For example, the $50^{th}$ percentile with respect to a utilization score is the score below which 50 percent of the observations may be found. For example, half or 50% of all utilization scores observed may be below score S1 and a score less than S1 is therefore said to be less than the $50^{th}$ percentile of the utilization scores. With reference to the PDF, the score of the $50^{th}$ percentile may be determined by counting the total cumulative number of occurrences of the PDF until the total number of occurrences=50% of all observed utilization scores.

Referring to FIG. 3B, shown is an illustration of a PDF for the CPU utilization indicator as described in connection with table 120 of FIG. 3. The example 150 of FIG. 3B illustrates a PDF which assumes a normal distribution. It should be noted that the use of standard deviations as described herein with determining an indicator value as a score for an indicator may also be used when the CPU utilization metric values for a population are in accordance with a non-normal distribution. Generally, the X axis may represent different indicator values of a metric or indicator, such as CPU utilization, when expressed in terms of standard deviations from the mean of the sample population. The mean 152 and standard deviations 156 are determined in accordance with a set of data values for a metric or indicator such as CPU utilization across the data storage systems of the data center. The Y axis may represent the frequency or number of occurrences of a measurement denoted on the X axis. The curve of FIG. 3B may generally represent a smoothed curve based on a number of measurements taken for the particular indicator. Element 154 may denote the scores or 11 possible different indicator values assigned in accordance with which range an observed value falls within as described in connection with the different standard deviation ranges denoted in column 122 of table 120.

Figure 4A:
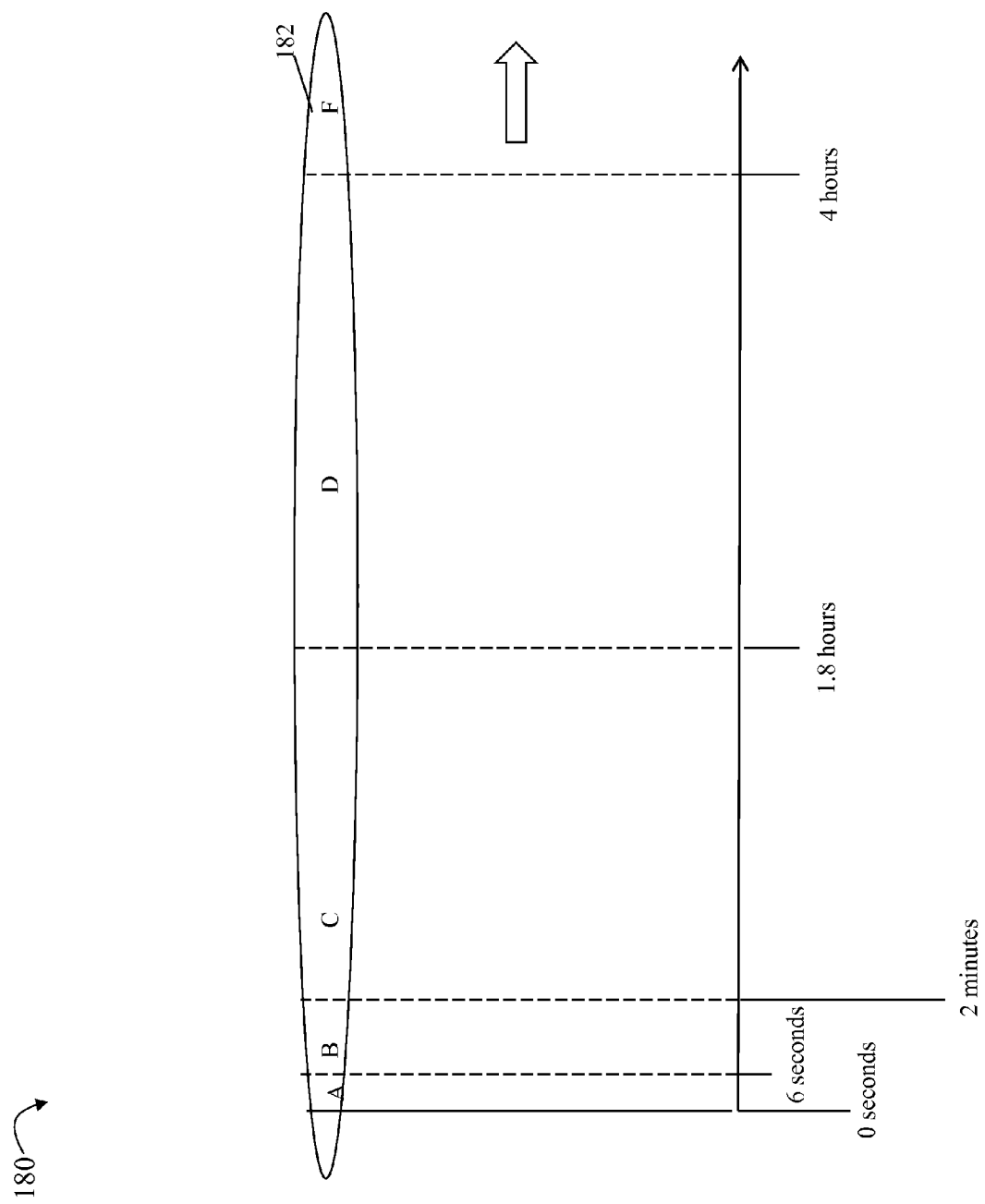

Referring to FIG. 4A, shown is another example of a metric used in connection with an indicator for which a score may be determined in an embodiment in accordance with techniques herein. The example 180 illustrates exemplary scores and ranges of time measurements denoting the amount of time that has lapsed since some particular activity such as last login or access described above in connection with indicators 612a-c of FIG. 2A. In connection with a login or usage metric, the measurements obtained may be expressed in terms of units of time, such as seconds, minutes, hours, days, and the like. In this example as represented by element 182, the score is denoted by an indicator value expressed as one of 5 possible letter grades of A, B, C, D, or F (e.g., with A being the highest or best grade, F being the lowest or worst grade, and the other letter grades denoted in decreasing order of ranking from highest to lowest). FIG. 4A may denote measurement ranges on the X axis having boundaries that are predetermined or configured rather than determined based on statistical analysis for a particular population. In other words, the same boundaries and ranges for determining grades or scores of A, B, C, D or F may be determined for any set of measurements and may not change based in the mean and standard deviation of such measurements. For example, an A may be assigned as the indicator value or score if the amount of time is less than or equal to 6 seconds; a B may be assigned as the indicator value or score if the amount of time of a measurement, M, is 6 seconds<M≤2 minutes; a C may be assigned as the indicator value or score if 2 minutes<M≤1.8 hours; a D may be assigned as the indicator value or score if 1.8 hours<M≤4 hours; and an F may be assigned if M is greater than 4 hours. Generally, FIG. 4A uses the first technique such as described above in connection with table 110 of FIG. 3 to determine an indicator value as a score. However, in connection with FIG. 4A the scoring granularity includes only 5 possible indicator values (e.g., A, B, C, D, or F) in contrast to the 11 possible indicator values (e.g., [0,10]) of FIG. 3.

Figure 4B:
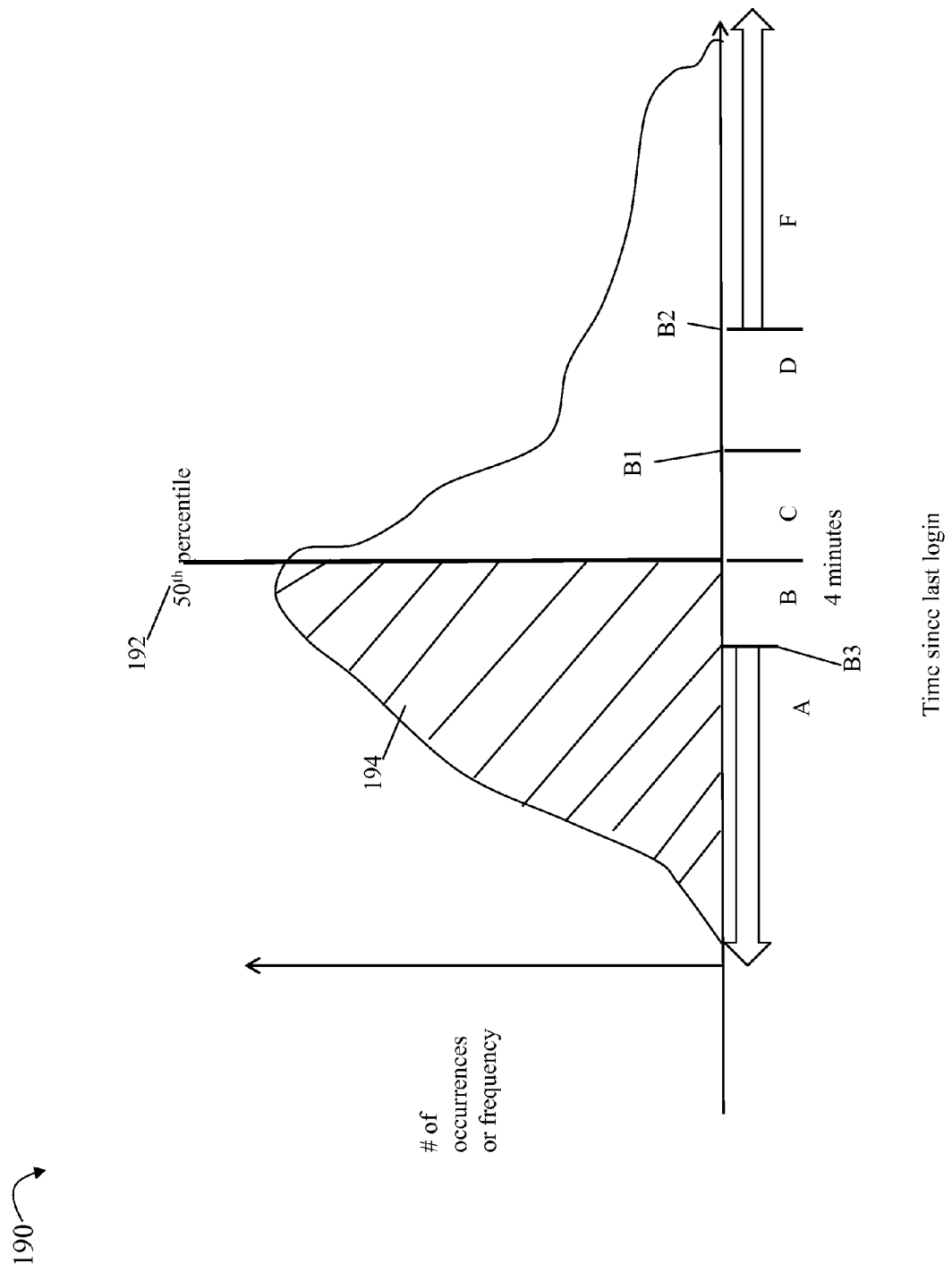

Referring to FIG. 4B, shown is an example illustrating another way of determining indicator values as scores for the login or usage metric as described in connection with FIG. 4A. The example 190 illustrates a PDF for the last login metric described in connection with FIG. 4A. As can be seen, the illustrated curve represents an exemplary non-normal distribution. Element 192 may denote 4 minutes, the measurement of the metric or indicator associated with the $50^{th}$ percentile whereby 50% of all observed measurements of the data set are less than 4 minutes. Element 194 denotes the shaded area under the curve representing the measurements of the data set which are below the $50^{th}$ percentile. For the set of measurements of the login or usage metric, a score may be assigned as follows: if the measurement is greater than the measurement of the $50^{th}$ percentile (e.g., 4 minutes), than the indicator value of the score may be assigned based on scaled letter grades with boundaries determining using statistical analysis as described in connection with table 120 of FIG. 3 and FIG. 3B (e.g., using letter grades having boundaries determined based on an amount of standard deviation(s) from the mean. Otherwise, the indicator value for the score may be assigned based on indicator values with predetermined boundaries (e.g., such as described in connection with FIG. 4A and table 110 of FIG. 3). FIG. 4B uses the second technique described above to determine a score of C, D or F based on the mean and standard deviation of the population or set of measurement values. Thus, the boundaries B1 and B2 delimiting the scoring ranges may correspond to some amount of standard deviations from the mean. Alternatively, the first technique described above using fixed or predetermined boundaries may be used to determine a score of A or B. Thus, the boundary B3 may correspond to some predetermined measurement value for the metric denoting the boundary.

It should be noted that the general approach described in FIG. 4B combining both predetermined boundaries and using scaled boundaries based on the standard deviation for the particular measurement set may be implemented in other variations. For example, depending on the indicator, if an observed measurement is less than some threshold (e.g., such as may be determined using a particular percentile, predetermined value, and the like), scaled boundaries based on the standard deviation for the particular measurement set may be used to determine an indicator value or score (e.g., as described in connection with FIG. 3B and table 120 of FIG. 3), and otherwise, predetermined boundaries defining different measurement ranges and associated indicator values may be used to determine the indicator value or score (e.g., as described in table 110 of FIG. 3 and FIG. 4A).

A score for a data storage system may be based on multiple indicators include a first indicator such as CPU utilization of FIG. 3 and a second indicator such as related to a time since last login or access as described in connection with FIGS. 4A and 4B. In this case, the data storage system may have a first indicator value or score in the range of [0,10] and a second indicator value or score that is one of 5 letters—A, B, C, D, or F. To determine a overall score for the data storage system, an embodiment may perform processing to normalize or scale the different indicator values to use the same scale or range of possible values. For example, the possible letters grades for the second indicator value may be normalized or scaled to a numeric value in the same range as the other indicators. For example, the normalized range may be a value between 0 and 10, or an integer value between 0 and 10, inclusively. In this case, the letter grades of A, B, C, D and F may be scaled or mapped to corresponding values in the normalized range. For example, A may be mapped to 10, B may be mapped to 8, C may be mapped to 6, D may be mapped to 4 and F may be mapped to 2. In this manner, indicator values having different levels of granularity may be mapped to the same set of common set of possible values in order to allow the indicator values to be combined to determine an overall score for a data storage system.

Figure 5:
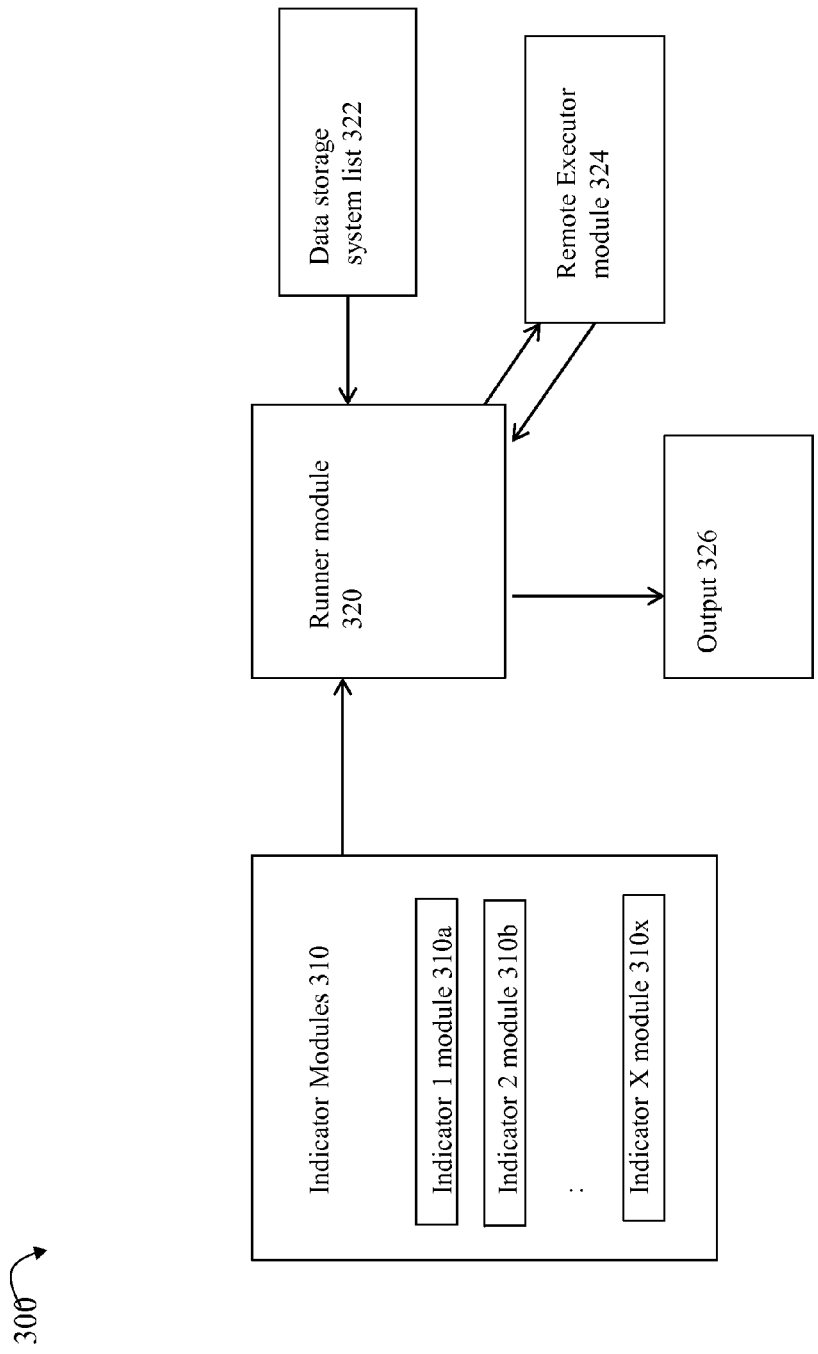
FIG. 5 is an exemplary architecture of modules that may be included in an embodiment in accordance with techniques herein.

Referring to FIG. 5, shown is an example of modules and data that may be included in an embodiment in accordance with techniques herein. The example 300 may illustrate various code modules and data included in an exemplary architecture used to determine the overall utilization in an embodiment in accordance with techniques herein. The example 300 includes indicator modules 310, a runner module 320, output 326, a data storage system list 322 and a remote executor module 324. The runner module 320 may be a main program or driver program that controls overall processing. The runner modules 320 may load one or more of the indicator modules 310a-310x for the corresponding indicators to be used in connection with determining overall utilization across one or more data storage systems. The indicator modules 310 may represent the coding logic, commands, and the like, used for calculating each indicator. There may be an indicator module in 310 for each of the different supported indicators and the runner module may selectively load appropriate modules from 310a-310x for those particular indicators to be used at a point in time with the list of data storage systems 322. For example, in an embodiment include X indicators whereby X is an integer greater than 1, each indicator may have a corresponding module in 310. If 4 particular indicators are to be used in determining utilization across the list of data storage systems 322, the runner module 320 may selectively load the 4 modules from 310 for the 4 indicators. The runner module 320 may pass control to a remote executor module 324 that executes the commands or code of each indicator module for each data storage system in the list 322 and returns results for each indicator to the runner module 320. The remote execute module 324 may facilitate communications with the data storage systems of the list to obtain the desired information for the selected indicators.

In one embodiment, the indicators 310 may be plugin modules and the modules of the example 300 may be written in the Perl programming language although generally any suitable programming language known in the art may be utilized.

In one embodiment, the runner module 320 may include all necessary coding logic for determining the data storage system level utilization scores and also the overall utilization score across all data storage systems in the list 322. In this embodiment, for each indicator, the runner module 320 may generate output 326 which may include the overall utilization across all data storage systems in the list 322 with respect to all selected indicators. The output 326 may also include a data storage system utilization score for each data storage system and may also include the different individual indicator values or scores for each data storage system such as described in connection with FIG. 2C. The runner module 320 may, for example, send the output 326 to a UI display, store the output 326 directly into a database or file, and the like, as may be desirable in a particular embodiment.

Alternatively, an embodiment of the runner module 320 may not include the coding logic that determines the data storage system level utilization scores or the overall utilization score. In this alternate embodiment, the remote executor 324 may return raw collected values to the runner module 320. In turn, the runner module 320 may provide the collected data as output 326 to another module (not illustrated) which embodies other coding logic to determine the data storage system utilizations scores and also the overall utilization across all data storage systems in the list 322. In this alternate embodiment, the output 326 may be provided to the other module directly or the runner module 320 may store the output to a database or file which is then read as input by the other module.

It should be noted that the above-mentioned architectures described in connection with FIG. 5 are merely examples and any suitable architecture, programming language, and the like, may be used.

Figure 6:
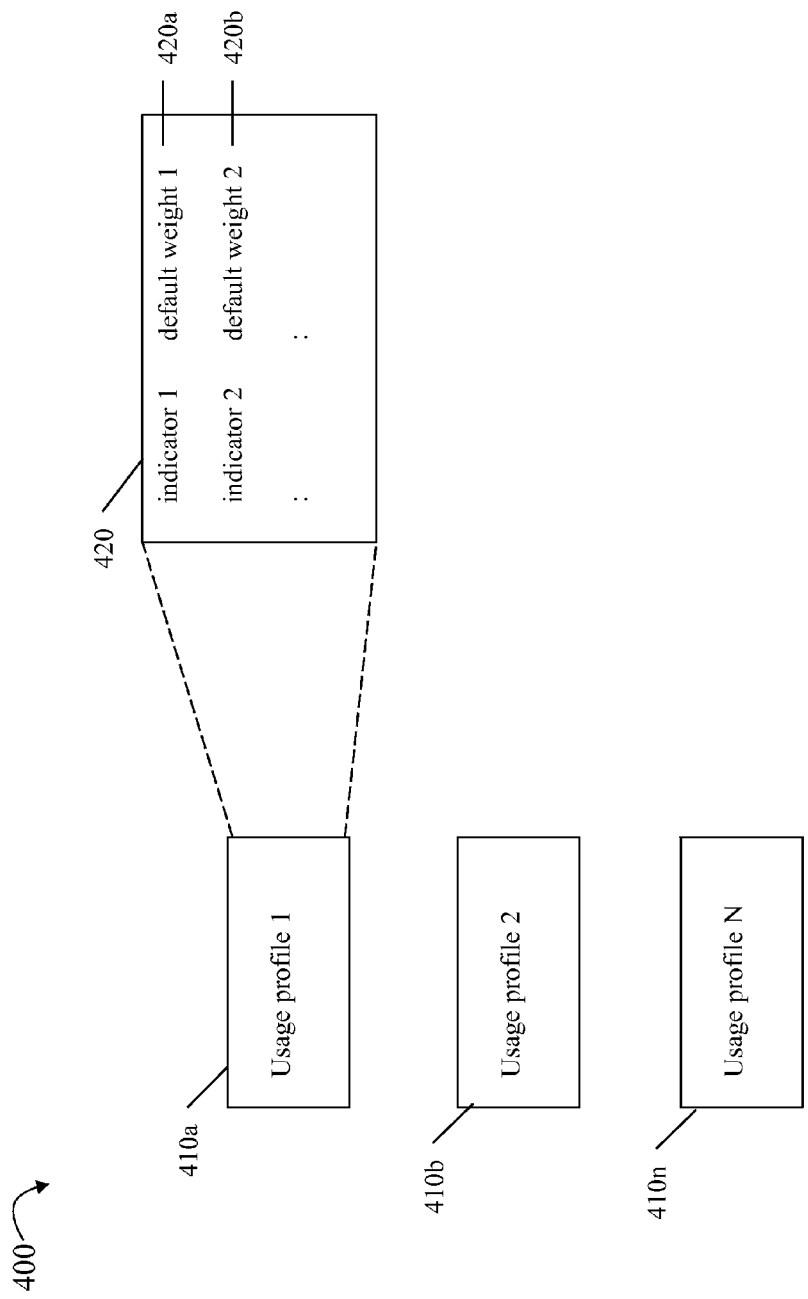
FIG. 6 is an example illustrating different usage profiles that may be used in an embodiment in accordance with techniques herein.

Referring to FIG. 6, shown is an illustration of usage profiles that may be used in an embodiment in accordance with techniques herein. The example 400 includes N usage profiles 410a-n. Each of the profiles 410a-n may identify a set of one or more indicators and associated indicator weights customized for determining utilization for a particular purpose. Element 420 denotes the pairs of indicators and associated default weights that may be included in profile 410a. Although 420 provides additional detail regarding the profile 410a, each of the remaining profiles 410b-n may include information similar to 420.

An embodiment may include usage profiles for determining utilization of the data storage systems with respect to testing (e.g., such as described in connection with the indicators of FIG. 2A), compliance with government rules and/or regulations, physical data storage device utilization per tier (only PD/storage tiering hallmarks), secondary caching utilization (only FAST CACHE indicators), a general or generic usage profile that may be used by a data storage administrator, and the like. In this manner, a usage profile may be selected such as from a GUI menu or list as described above. The profile may identify a selected portion of all the supported or available indicators for determining utilization for a particular purpose. Such indicators may be used to measure utilization with respect to one or more resources, services, and the like, of the data storage system for the particular purpose. It should be noted that if an indicator is disabled or not selected for use in determining utilization in a profile, the profile may denote this in any suitable manner. For example, the profile may identify the indicator that is not used in assessing the utilization by assigning the indicator a weight of zero (0). Alternatively, the profile may simply omit the indicator which is not used whereby the profile may only identify those indicators having non-zero weights.

What will now be described are some additional indicators and profiles that may be included in an embodiment in accordance with techniques herein.

An embodiment may include a generic usage profile, for example, for use by a data storage administrator whereby a different set of indicators may be selected for use other than those of the testing or development usage profile such as described in FIG. 2A. For example, indicators of 618 may be selected for use with the testing profile but not with the generic usage profile. However, the data storage administrator may want to determine utilization of the data storage system with respect available storage capacity, such as how much of the total storage capacity of the data storage system is used or currently has user data stored, and one or more indicators regarding I/O throughput (e.g., number of reads and/or writes per second or other unit of time) and/or data transfer (e.g., bytes/second). If the data storage system includes multiple storage tiers, the storage administrator may desire such information regarding utilization for each tier.

Referring to FIG. 6B, shown is an example of additional hallmark or indicator categories and associated indicators that may be used in an embodiment in accordance with techniques herein. The indicators of 800 may be used in connection with other usage profiles such as the generic usage profile and others noted above.

The example 800 includes a table with a first column of hallmark or indicator categories 810 and a second column of indicators 820. The indicators in column 820 have been partitioned into 3 illustrated indicator categories as denoted in column 810. Generally, each of the categories of 810 represent a grouping of indicators that may be used in determining a level of utilization of a single data storage system and/or across multiple data storage systems similar to as described in connection with FIG. 2A.

The secondary cache category 812 may include the following indicators: secondary cache full indicator 812a (e.g., may be represented as a percentage) and secondary cache hit rate indicator 812b. The storage tiering category 814 may include the following indicators: percentage of storage used indicator per tier 814a and I/O throughput indicator for each tier 814b. The data protection category 814 may include the following indicators: percentage of provisioned storage elements which have snapshot schedules indicator 816a, % of provisioned storage elements which have active local data replication indicator 816b, % of provisioned storage elements which have active remote data replication indicator 816b, % of disk space used for data protection indicator 816d, RPO (recovery point objective) indicator 816e, and snapshot frequency indicator 816f The indicators of FIG. 6B are described in more detail below.

In connection with the indicators of FIG. 6B, as known in the art, it should be noted that a snapshot may be characterized as a point in time "virtual" or logical copy of a data set. Software of a data storage system may provide one or more data replication services or facilities whereby a snapshot is one such facility. Generally, replication may refer to a broader category of services for creating a copy of a data set and a snapshot may be one particular type of replication service. Other types of replication services may provide for creating a complete physical or duplicate copy of data. For example the SnapView™ application is an application provided by EMC Corporation which may be used to create point in time snapshot of production data for nondisruptive backup. For example, a snapshot may be made with respect to a source LUN thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software to copy the original data prior to changes into another area of storage. With respect to COFW techniques, the COFW occurs only once for each data block modified on the source LUN. Since only changed data blocks of the source LUN are retained rather than make a complete copy of the source LUN, the storage capacity required to implement snapshots may be considerably less than that of the source LUN. A snapshot of a LUN is a virtual point in time copy and requires access to the unchanged data in the source LUN. Therefore failures affecting the source LUN also affect the snapshot of the LUN. Snapshots of a LUN may be contrasted, for example, with clones, mirrors or other bit-for-bit replica data copies of a source LUN.

As described above, an embodiment may include a utilization profile with customized selection of indicators to determine different aspects of utilization related to compliance with government rules and/or regulations, customer specified requirements, and the like. For example, there may be government specified rules or regulations which identify particular indicators to be monitored in connection with determining utilization as related to data protection. Regulations may specify, for example, that in the event of a data disaster, provisioned storage be recoverable within a maximum amount of time, may specify that provisioned storage have a mirror or replicate data copy on the same data storage system, may specify that provisioned storage have a remote mirror or replicate data copy on another data storage system, and the like. In this case, the usage profile for government rules or regulations may identify one or more of the data protection indicators 816a-f. The usage profile for government rules of regulation compliance may select for use in determining utilization one or more indicators may be provided which identify, for example, a percentage of provisioned storage elements of the data storage system for which local data replication is performed as with 816b, and a percentage of provisioned storage elements of the data storage system for which remote data replication is performed 816c, and a percentage of provisioned storage elements which have snapshot schedules 816a. In order to be compliant, it may be that one or more of the foregoing percentages should be a specified threshold percentage, such as 100%, otherwise the system may be determined as non-compliant with these particular data protection requirements. The selected indicators for compliance related to data protection aspects of the usage profile may also include a recovery point objective (RPO) indicator 816e for the data storage system which identifies the maximum acceptable level of data loss following an unplanned event (e.g., such as a natural or man-made disaster or technical disruption) that may cause a data loss. The RPO identifies an amount of time (e.g., in terms of minutes, hours, days, etc.) denoting a tolerable data loss. For example, an RPO of 4 hours for a system denotes that losing up to the last 4 hours worth of new data is tolerable. The RPO may be used, for example, in determining the frequency of backup or the frequency with which data is replicated locally and/or remotely. If the RPO is 4 hours, a copy or backup of data should be performed every at least every 4 hours to maintain the desired RPO. The regulation may specify a maximum amount of time MAX serving as an upper bound for the RPO in that the data storage system should have an RPO less than or equal to MAX. A grade or score for the RPO of the data storage system may be assigned based on different ranges for RPO values. Furthermore, the indicators may include a backup or snapshot frequency indicator expressed in terms of minutes, hours, days, and the like. In this case, the backup or snapshot frequency indicator 816f may denote an amount of time, such as 4 hours, whereby a backup or snapshot is performed every 4 hours. The backup or snapshot frequency indicator may denote a level of utilization of a data protection service performing the backup or snapshot operation. In this manner, the profile may include a customized selection of indicators representing particular aspects of utilization of certain data protection services which provide a basis for determining compliance or non-compliance with a set of requirements. For other aspects or types of compliance, different indicators may be selected for inclusion in a usage profile.

What will now be described are the secondary cache indicators 812. An embodiment of a data storage system may perform what may referred to as "fast caching" whereby flash-based storage drives are used for caching data. As described below in more detail, if a data storage system has a high utilization rate with respect to fast-caching, the data storage system performance may further benefit (e.g., have further increased performance in terms of decreased I/O response time) by further increases to the amount of "fast" cache. Generally, an embodiment in accordance with techniques herein may include a primary cache such as a DRAM cache used for storing data for servicing read and write operations as described elsewhere herein. An embodiment may also define another caching tier used as a secondary cache, or fast cache, in addition to the foregoing primary cache. The secondary cache may be an amount of flash-based storage, or more generally, SSDs, used for caching frequently accessed data. The caching tier or secondary cache may be positioned in data flow between the primary cache and the hard disk drives or non-volatile storage used for storing data. The secondary cache may extend the caching capacity of the primary cache by copying frequently accessed data to the secondary cache of SSD storage. The primary cache may be used such as described herein in connection with read and write operations. Additionally, the secondary cache of SSD storage may be used to store a copy of the most frequently accessed data. As the frequency of access to particular data portions change over time, so may the data portions stored in the secondary cache. Those data portions determined at a current point in time as having the highest number of accesses (e.g., reads and/or write operations) are copied to the secondary cache and is not dependent on whether such data is already in the primary cache. In this manner, read and write operations from a host to a frequently accessed data portion may be serviced faster if the data portion is stored in the secondary cache. In accordance with the particular usages of the primary and secondary caches as just described, different criteria may be used in deciding what data portions are stored or copied in each of the two caches and how long a data portion may remain in one of the caches. Frequency of access may be the sole criteria for determining what data portions are in all portions of the secondary cache at any point in time. Thus, the secondary cache may have a dedicated use of storing copies of frequently accessed data. Although some primary caching techniques may be used which allow one data portion that is accessed more frequently than another to remain in the primary cache longer than the other, the primary cache criteria and usage may differ from that of the secondary cache.

A data storage system may be configured to enable use of the secondary cache or not. Use of the secondary cache may be enabled or disabled at varying levels of granularity such as per LUN, per storage pool, and the like, as may be supported in a particular embodiment. A storage pool may identify a group of one or more physical storage devices from which one or more LUNs have storage provisioned. Thus, use of one or more indicators related to utilization of the secondary cache resource may be beneficial since, if the secondary cache is highly utilized (thereby indicating that such secondary caching feature has been enabled for use with existing provisioned storage), system performance may further benefit adding additional SSDs configured for secondary cache usage. For example, a first data storage system may be identified as having an "A" in secondary cache utilization and a second data storage system may be identified as having an "F" in secondary cache utilization. It may be that the second data storage system has not been enabled to use its secondary cache. It may be decided to move SSDs providing the secondary cache for the second data storage system to the first data storage system since secondary caching has been enabled and is highly used on the first system. In this manner, the secondary cache utilization scores for the data storage systems may be used to identify those systems which are potential or candidate donors of SSDs, such as the second data storage system, and which are potential candidate receivers of the donated SSDs, such as the first data storage system. The secondary cache full indicator 812a may denote a percentage which represents an average percentage of the secondary cache that is used to store frequently accessed data as described above. The secondary cache hit rate indicator 812b may be a percentage which represents an average percentage of read operations which result in a secondary cache hit. As known in the art, a cache hit with respect to an I/O operation occurs when the I/O operation requests data that can be serviced from cache rather than having to retrieve a copy of the data from a physical storage device. An embodiment may have a usage profile which only selects indicators 812a, 812b for determining utilization of the secondary or fast cache. An embodiment may include other usage profiles, such as the generic usage profile, which selects indicators 812a-b along the additional indicators such as 814a-b and 816a-f (e.g. all indicators of FIG. 6B).

Indicators of category 814 relate to utilization of each of the storage tiers and may be used in an embodiment may be used to provide an indication regarding what individual storage tiers are highly utilized and which are not. An embodiment may have a usage profile, such as one for determining utilization with respect to physical storage devices, in which only the indicators 814a-b may be selected. As noted above, an embodiment may have additional usage profiles such as the generic usage profile in which indicators 814a-b are also selected for determining utilization for a different purpose or context. As described elsewhere herein, 814a and 814b may denote indicator values or scores which are generated for each storage tier that may be defined in the data storage system.

Generally, a data storage system having a utilization score based on the storage tier indicators 814a-b may be used to identify which one or more storage tiers should have added or increased capacity (e.g., by increasing the number of physical drives). For example, if the storage tier utilization indicators for a particular tier of a data storage system, when combined, result in a utilization score above or at a specified threshold, (e.g., such as an A grade described elsewhere herein) this may indicate to add more physical drives to the particular storage tier and that such additional drives would likely be highly utilized as with the existing drives of the particular storage tier. If a data storage system includes a first storage tier having a low utilization with respect to the storage tier indicators for the first tier (e.g., such as an overall grade of D or F with respect to all indicators in the storage tier indicator category 814 for the first tier), it may denote that such physical drives of the first tier are underutilized or not utilized and some of the physical drives of the first tier may be moved to another data storage system which may make better use of the physical drives. For example, a first data storage system may be identified as having an "A" in utilizing storage of a first tier (e.g., combined grade of 814a-b for the first tier) and a second data storage system may be identified as having an "F" in utilizing storage of the first tier (e.g., combined grade of 814a-b for the first tier). It may be decided to move storage devices of the first tier from the second data storage system to the first data storage system since the first data storage system is not utilizing all such devices. In this manner, the storage tier utilization based indicators of 814 for the data storage systems may be used to determine a utilization score to identify those systems which are potential or candidate donors of drives of the first tier (e.g., such as the second data storage system), and which data storage systems (e.g., such as the first data storage system) are potential candidate receivers of the donated first tier storage devices.

With reference back to FIG. 2B, illustrated are elements that may be included in a GUI for use with techniques herein. Additionally, consistent with description elsewhere herein, a user may be allowed to configure or tune other values for use with techniques herein. For example, a user may be allowed to specify values for the predetermined boundaries used with determining the ranges when scoring indicators. For example, with reference to table 110 of FIG. 3, the GUI may allow a user to select what utilization percentages define one or more of the ranges denoted in column 112. An embodiment may similarly allow a user to select the number of possible indicator values and thus number of associated possible scores or grades.

To further illustrate techniques herein, a data storage administrator may want to determine a data storage system level utilization score for all data storage systems and then sort or rank all such data storage system level utilization scores to identify a set of one or more data storage systems which are least utilized. In performing this assessment, the administrator may select the generic usage profile identifying the indicators used in connection with performing the utilization assessment. For example, the usage profile may select all indicators illustrated in 800 of FIG. 6B. After the utilization scores are determined for each data storage system, the administrator may further use functionality provided via the GUI to sort the data storage system level utilization scores and identify a number of least utilized data storage systems that may be turned off or otherwise have their data migrated to another data storage system in efforts to consolidate data and reduce the number of data storage systems. For this use case, the utilization may be determined with respect to end-user data storage system resource usage for provisioned storage such with respect to resources used by applications executing on hosts which store their data on the data storage systems.

More generally, an embodiment may provide a flexible GUI to facilitate viewing and sorting utilization data in a variety of different ways. For example, the GUI may provide an overall utilization score across all data storage systems. The user may then select different GUI options to further drill down and determine additional details comprising the overall score for the data center. As a first step, the user may view and/or sort data storage system level utilization scores as described above. As further steps, the user may select appropriate UI elements to view details of all, or one or more selected indicators, for a single data storage system, or for one or more selected data storage systems. (e.g., view a single indicator for all data storage system, view all indicators for a single data storage system). The user may also select to view one category or hallmark of indicators for one or more selected data storage systems.

An embodiment may store data for one or more other indicators over a time period in a database or other data container and view such data to perform historical trend analysis. An embodiment may also include one or more indicators which may be characterized as denoting a trend or rate of change over a time period.

Figure 7:
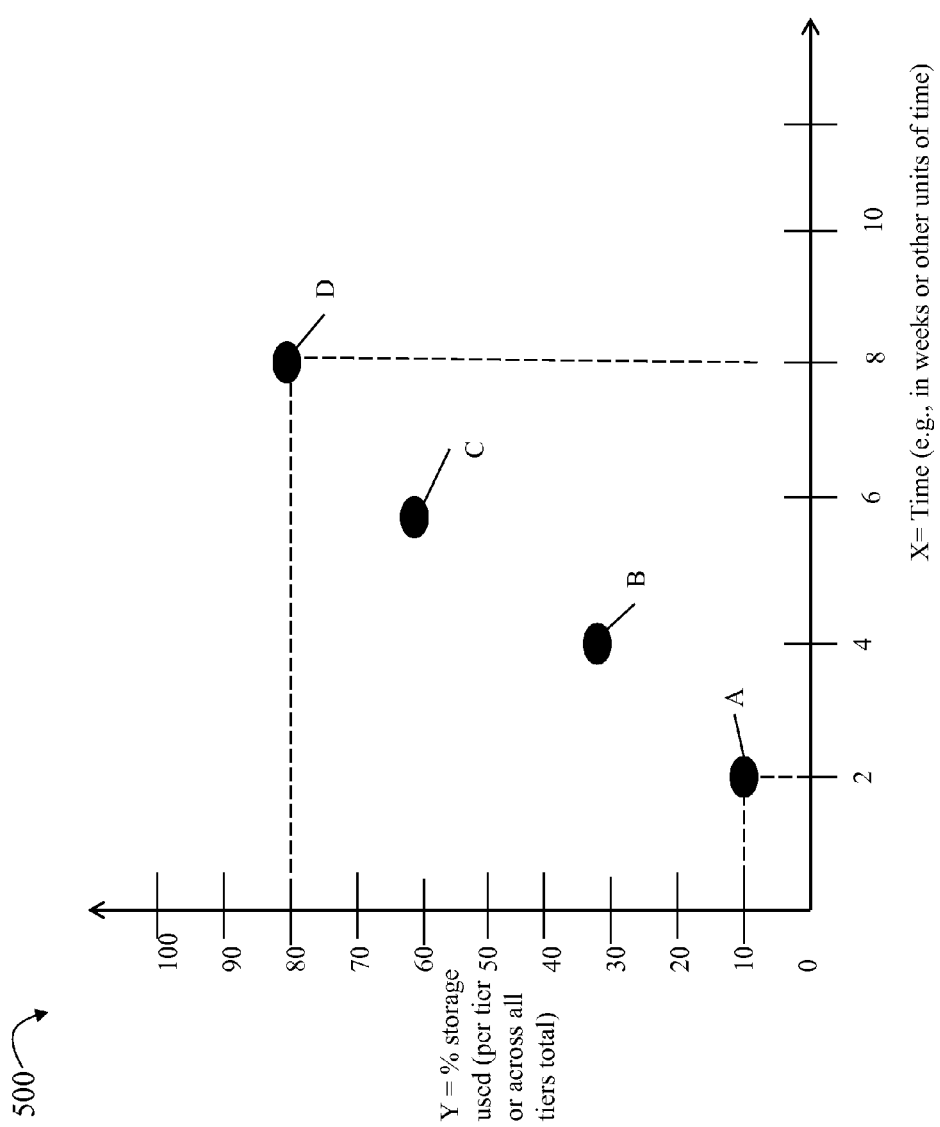
FIG. 7 is an example illustrating a rate of change indicator that may be used in an embodiment in accordance with techniques herein.

With reference to FIG. 7, shown is an example illustrating an indicator denoting a rate of change with respect another indicator. For example, a first indicator may be indicator 814a denoting the percent of storage used or consumed for storing user data for a single tier. It may be desirable to use a second indicator that denotes the rate of change of the first indicator with respect to a time period. Generally, the second indicator may be based on the slope of the line or rate of change of the first indicator over time. The example 500 may be a plot of data points A-D corresponding to different values of the metric or measurement of % of the storage tier used as denoted on the Y axis at different points in time as denoted on the X axis. More generally, the metric or measurement on the Y axis may be with respect a single indicator or associated metric or multiple such metrics. For example, the value of the Y axis may represent an average percentage with respect all storage tiers in the system, a single storage tier, or one or more selected storage tiers.

The time period for which the rate of change indicator is determined may be specified. For example, an embodiment may define the time period with a first starting time and second ending time whereby each of the foregoing two times correspond to two different points on the plotted curve. For example, assume that point D represents the current time and the rate of change indicator is determined with respect to the last 6 weeks. In this case, the rate of change indicator may be based on the slope of the line formed between points A and D since point A is associated with the measurement 6 weeks prior to the measurement denoted by point D. As known in the art, the slope is the difference in Y coordinates/the difference in X coordinates so that in this case the slope is 7/6. The rate of change indicator may be assigned an indicator value or score based on the foregoing slope. For example, the slope may be mapped to one of three predetermined values of LOW, MEDIUM or HIGH denoting, respectively, low, medium, and high rates of change or rate of storage utilization in this case. The following slope values may be mapped as follows:

| Slope | Indicator value |
|---|---|
| <0.6 | Low |
| >0.6 and <1.0 | Medium |
| >1.0 | High |

The foregoing indicator may be used, for example, for capacity planning and may be used to generate alerts, for example, responsive to slopes greater than a particular threshold.

Generally, the information provided using techniques herein may be used in many different ways in connection with data storage system management. As yet another example, consider an application executing on a host whereby the host issues I/Os to 3 different data storage systems. The host may utilize load balancing techniques and it may be that the workload of I/Os for the particular application should be approximately evenly distributed across the three data storage system. If the load balancing is being performed properly, it may be expected that there should be not more than a threshold amount of standard deviation in one or more indicators such as I/O throughput of each of the data storage systems. In this manner, the techniques herein may be used to determine a score for each data storage system based on the one or more indicators whereby the score for each indicator may be based on the standard deviation from the mean as described in connection with table 120 of FIG. 3 and FIG. 3B. The foregoing data storage system level scores may be viewed by the administrator to determine whether there is a large amount of standard deviation in the metrics used to determine the indicators or not. A good score, such as A if the grade ranking is used, may denote that the systems have observed measurement values of the metrics analyzed by the indicators which have an acceptable level of deviation or variance.

Figure 8:
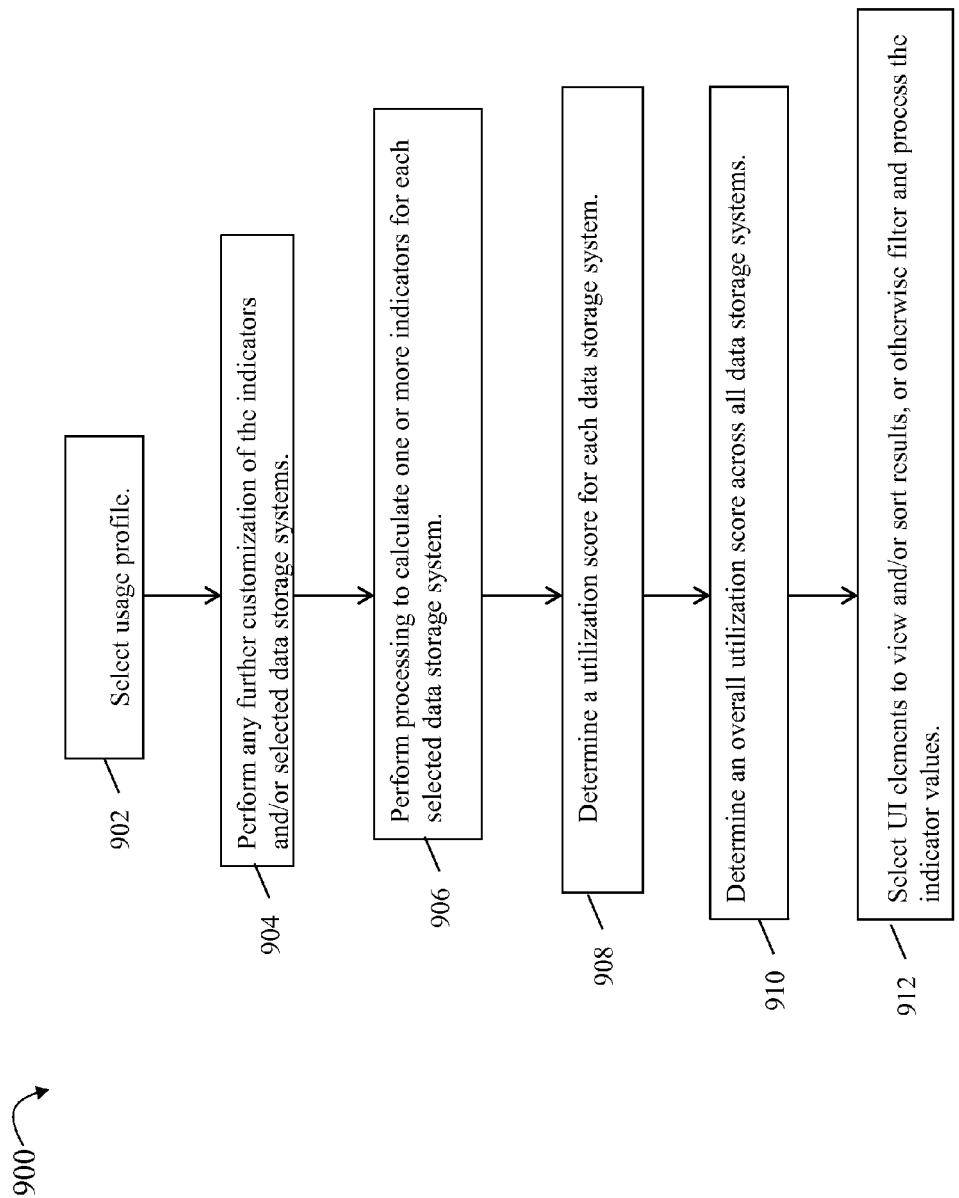
FIG. 8 is a flowchart of processing steps that may be performed in an embodiment in accordance with techniques herein.

Referring to FIG. 8, shown is a flowchart of processing steps that may be performed in an embodiment in accordance with techniques herein. The example 900 summarizes processing steps as described above. At step 902, a user may selected a usage profile such as by making a menu selection from a GUI display. At step 904, the user may perform any further customizations of the indicators and data storage systems selected for which utilization will be performed. At step 906, processing may be performed calculate one or more indicators for each selected data storage system. At step 908, a utilization score may be determined for each of the data storage systems. At step 910, an overall utilization score may be determined across all data storage systems selected in step 904. At step 912, the user may select UI elements to view and/or sort the results, or otherwise filter and process the indicator values in other ways (some of which are mentioned above).

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium (also referred to as a computer readable medium) having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of determining utilization comprising:
selecting, for a particular usage context, a usage profile from a plurality of usage profiles, each of said plurality of usage profiles being associated with one of a plurality of usage contexts and identifying a recommended or default set of utilization indicators selected for the one usage context;
receiving, using a processor, a plurality of indicator values for a plurality of utilization indicators for each system included in a plurality of systems, each of the plurality of indicator values representing a score for a different one of the plurality of utilization indicators identified in the usage profile selected for the particular usage context;
determining, using a processor, a system utilization score for each of the one or more systems in accordance with the plurality of indicator values for said each system;
determining, using a processor and a first set of indicator values for at least one of the plurality of utilization indicators associated with a first resource, a first system of the plurality of systems and a second system of the plurality of systems, wherein said first system is a donor of the first resource and has an associated indicator value in the first set indicating that the first system underutilizes the first resource, said second system is a receiver of the first resource and has an associated indicator value in the first set indicating that the second system has a utilization level of the first resource above a specified threshold, and wherein the first resource includes flash-based storage devices used as a secondary cache having a dedicated use of storing copies of frequently accessed data and the at least one of the plurality of utilization indicators include one or more indicators regarding secondary cache usage; and
responsive to determining that the first system underutilizes the first resource and the second system has a utilization level of the first resource above the specified threshold, moving at least a portion of the first resource of the first system to the second system.

2. The method of claim 1, wherein the system utilization score for said each system is determined as a weighted average of the plurality of indicator values for said each system.

3. The method of claim 1, further comprising:
determining an overall utilization score of the plurality of systems in accordance with the system utilization score for each of the one or more systems, wherein the overall utilization score of the plurality of system is determined as an average of the system utilization scores for the plurality of systems.

4. The method of claim 1, wherein each system in the set is a data storage system.

5. The method of claim 1, wherein the plurality of utilization indicators includes any of: last login to operating system indicator, last usage or access of a system using the webserver indicator, last interaction or login to data storage management software indicator, last time a storage processor of a system executed in a special service mode, percentage of storage provisioned indicator, average CPU load or CPU utilization, and network traffic indicator, a boolean indicator as to whether data storage management software has been configured or installed, a boolean indicator as to whether one or more licenses for software are installed on a system, a software version number, date or age of the currently installed software indicator, test data indicator identifying a most recent time that a system was used in connection with automated or other testing, secondary cache full indicator, secondary cache hit rate indicator, percentage of storage used indicator per tier, I/O throughput indicator for each tier, percentage of provisioned storage elements which have snapshot schedules indicator, percentage of provisioned storage elements which have active local data replication indicator, percentage of provisioned storage elements which have active remote data replication indicator, percentage or amount of disk space used for data protection indicator, and snapshot frequency indicator, and wherein the plurality of utilization indicators are partitioned into a plurality of utilization indicator categories include any of: access indicator category, resource usage indicator category, configuration indicator category, automated test indicator category, secondary cache category, storage tiering category, and data protection category.

6. The method of claim 5, wherein the plurality of utilization indicators includes a first utilization indicator from a first of the plurality of utilization indicator categories and a second utilization indicator from a second of the plurality of utilization indicator categories.

7. The method of claim 5, wherein the plurality of utilization indicators includes multiple utilization indicators from a same one of the plurality of utilization indicator categories.

8. The method of claim 1, wherein the plurality of utilization indicators includes a first utilization indicator, and the plurality of indicator values for each of the systems includes a first indicator value for the first utilization indicator, and wherein the method includes:
collecting a plurality measurement values for the first utilization indicator, each of the plurality of measurement values identifying a measurement of the first utilization indicator for one of the plurality of systems;
determining a mean and a standard deviation with respect to the plurality of measurement values; and
determining the first indicator value for the first utilization indicator for each of the systems in accordance with the standard deviation and a difference between one of the measurement values for said each system and the mean.

9. The method of claim 1, wherein the plurality of utilization indicators includes a first utilization indicator, and the plurality of indicator values for each of the systems includes a first indicator value for the first utilization indicator, and wherein the method includes:
collecting a plurality measurement values for the first utilization indicator, each of the plurality of measurement values identifying a measurement of the first utilization indicator for one of the plurality of systems; and
determining the first indicator value for the first utilization indicator for each of the systems in accordance with a set of predetermined ranges and indicator values associated with each of the predetermined ranges.

10. A method of determining utilization comprising:
receiving, using a processor, a plurality of indicator values for a plurality of utilization indicators for each system included in a plurality of systems, each of the plurality of indicator values representing a score for a different one of the plurality of utilization indicators;
determining, using a processor, a system utilization score for each of the one or more systems in accordance with the plurality of indicator values for said each system;

determining, using a processor and a first set of indicator values for at least one of the plurality of utilization indicators associated with a first resource, a first system of the plurality of systems and a second system of the plurality of systems, wherein said first system is a donor of the first resource and has an associated indicator value in the first set indicating that the first system underutilizes the first resource, said second system is a receiver of the first resource and has an associated indicator value in the first set indicating that the second system has a utilization level of the first resource above a specified threshold, and wherein the first resource includes flash-based storage devices used as a secondary cache having a dedicated use of storing copies of frequently accessed data and the at least one of the plurality of utilization indicators include one or more indicators regarding secondary cache usage; and responsive to determining that the first system underutilizes the first resource and the second system has a utilization level of the first resource above the specified threshold, moving at least a portion of the first resource of the first system to the second system, wherein the plurality of utilization indicators includes a first utilization indicator, and the plurality of indicator values for each of the systems includes a first indicator value for the first utilization indicator, and wherein the method includes:

collecting a plurality measurement values for the first utilization indicator, each of the plurality of measurement values identifying a measurement of the first utilization indicator for one of the plurality of systems;

determining a mean and a standard deviation with respect to the plurality of measurement values;

determining a threshold measurement value associated with a specified percentage denoting that the specified percentage of the plurality of systems has a measurement value included in said plurality of measurement values that is equal to the threshold measurement value;

for each of the plurality of measurement values for one of the plurality of systems, determining whether said each measurement value is greater than said threshold measurement value; and if said each measurement value is greater than said threshold measurement value, determining the first indicator value for the first utilization indicator for said one system in accordance with the standard deviation and a difference between said measurement value and the mean, and otherwise determining the first indicator value for the first utilization indicator for said one system in accordance with a set of predetermined ranges and indicator values associated with each of the predetermined ranges.

11. The method of claim 2, wherein the plurality of utilization indicators for each system is selected from a set of available utilization indicators and associated weights included in the usage profile.

12. The method of claim 11, wherein each of the plurality of usage profiles identifies one or more of utilization indicators from the set of available indicators, wherein said each usage profile customizes selection of utilization indicators and associated weights.

13. The method of claim 1, wherein each of the plurality of utilization indicator values for one of the plurality of utilization indicators is determined by normalizing a measurement value for said one utilization indicator.

14. The method of claim 13, wherein said normalizing includes mapping the measurement value to an indicator value in a predetermined range.

15. A system comprising:
a plurality of data storage systems;
a non-transitory computer readable medium comprising code stored thereon that, when executed, performs a method comprising:
selecting, for a particular usage context, a usage profile from a plurality of usage profiles, each of said plurality of usage profiles being associated with one of a plurality of usage contexts and identifying a recommended or default set of utilization indicators selected for the one usage context;
receiving, using a processor, a plurality of indicator values for a plurality of utilization indicators for each system included in a plurality of systems, each of the plurality of indicator values representing a score for a different one of the plurality of utilization indicators identified in the usage profile selected for the particular usage context;
determining, using a processor, a data storage system utilization score for each of the one or more data storage systems in accordance with the plurality of indicator values for said each data storage system;
determining, using a processor and a first set of indicator values for at least one of the plurality of utilization indicators associated with a first resource, a first data storage system of the plurality of data storage systems and a second data storage system of the plurality of data storage system systems, wherein said first data storage system is a donor of the first resource and has an associated indicator value in the first set indicating that the first data storage system underutilizes the first resource, said second data storage system is a receiver of the first resource and has an associated indicator value in the first set indicating that the second data storage system has a utilization level of the first resource above a specified threshold, and wherein the first resource includes flash-based storage devices used as a secondary cache having a dedicated use of storing copies of frequently accessed data and the at least one of the plurality of utilization indicators include one or more indicators regarding secondary cache usage; and
responsive to determining that the first data storage system underutilizes the first resource and the second data storage system has a utilization level of the first resource above the specified threshold, moving at least a portion of the first resource of the first data storage system to the second data storage system.

16. The system of claim 15, wherein the data storage system utilization score for said each data storage system is determined as a weighted average of the plurality of indicator values for said each data storage system.

17. The system of claim 15, wherein the method comprises determining an overall utilization score of the plurality of data storage systems in accordance with the system utilization score for each of the plurality of data storage systems and wherein the overall utilization score is determined as an average of the data storage system utilization scores for the plurality of data storage system.

18. The system of claim 15, wherein processing to determine a first of the indicator values for one of the plurality of utilization indicators includes performing statistical analysis of a measurement for the one utilization indicator.

19. A non-transitory computer readable medium comprising code stored thereon that, when executed, performs a method for determining utilization comprising:
- selecting, for a particular usage context, a usage profile from a plurality of usage profiles, each of said plurality of usage profiles being associated with one of a plurality of usage contexts and identifying a recommended or default set of utilization indicators selected for the one usage context;
- receiving, using a processor, a set of one or more indicator values for a set of one or more corresponding utilization indicators for each of a plurality of systems, each indicator value in the set of indicator values representing a score for a different one of the utilization indicators in the set of one or more corresponding utilization indicators identified in the usage profile selected for the particular usage context;
- determining, using a processor, a system utilization score for each of the plurality of systems in accordance with the set of indicator values for said each system;
- viewing the system utilization score for each of the plurality of systems on a user interface display;
- determining, using a processor and a first set of indicator values for at least one of the plurality of utilization indicators associated with a first resource, a first system of the plurality of systems and a second system of the plurality of systems, wherein said first system is a donor of the first resource and has an associated indicator value in the first set indicating that the first system underutilizes the first resource, said second system is a receiver of the first resource and has an associated indicator value in the first set indicating that the second system has a utilization level of the first resource above a specified threshold, and wherein the first resource includes flash-based storage devices used as a secondary cache having a dedicated use of storing copies of frequently accessed data and the at least one of the plurality of utilization indicators include one or more indicators regarding secondary cache usage; and
- responsive to determining that the first system underutilizes the first resource and the second system has a utilization level of the first resource above the specified threshold, moving at least a portion of the first resource of the first system to the second system.

20. The non-transitory computer readable medium of claim 19, wherein the computer readable medium further includes code that determines an overall utilization score for the plurality of systems in accordance with the system utilization score for each system.

21. The method of claim 1, wherein the at least one of the plurality of utilization indicators include a secondary cache full indicator and a secondary cache hit rate indicator, said secondary cache full indicator denoting an average percentage of secondary cache that is used, and said secondary cache hit rate indicator denoting an average percentage of read operations resulting in a secondary cache hit.

* * * * *